United States Patent
Yang et al.

(10) Patent No.: US 9,876,621 B2
(45) Date of Patent: Jan. 23, 2018

(54) METHOD FOR TRANSMITTING SIGNAL AND APPARATUS FOR SAME

(71) Applicant: LG Electronics Inc., Seoul (KR)

(72) Inventors: Suckchel Yang, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 14/759,545

(22) PCT Filed: Jan. 9, 2014

(86) PCT No.: PCT/KR2014/000255
§ 371 (c)(1),
(2) Date: Jul. 7, 2015

(87) PCT Pub. No.: WO2014/109569
PCT Pub. Date: Jul. 17, 2014

(65) Prior Publication Data
US 2015/0365218 A1    Dec. 17, 2015

Related U.S. Application Data

(60) Provisional application No. 61/750,753, filed on Jan. 9, 2013, provisional application No. 61/756,467, filed on Jan. 25, 2013.

(51) Int. Cl.
*H04L 12/28* (2006.01)
*H04L 5/00* (2006.01)
(Continued)

(52) U.S. Cl.
CPC .......... *H04L 5/0053* (2013.01); *H04L 5/0044* (2013.01); *H04L 5/0051* (2013.01);
(Continued)

(58) Field of Classification Search
CPC ..... H04L 5/001; H04L 5/0053; H04L 5/0051; H04L 25/0224; H04L 5/0035;
(Continued)

(56) References Cited

U.S. PATENT DOCUMENTS

2011/0143696 A1    6/2011   Luo et al.
2011/0312316 A1    12/2011  Baldemair et al.
(Continued)

FOREIGN PATENT DOCUMENTS

CN    101594683 A    12/2009
CN    102098086 A    6/2011
(Continued)

OTHER PUBLICATIONS

Nokia: "Remaining Issues on Multiple Timing Advance", R1-124177, 3GPP TSG RAN WG1 Meeting #70bis, San Diego, USA, Oct. 8-12, 2012.
(Continued)

*Primary Examiner* — Noel Beharry
*Assistant Examiner* — Lionel Preval
(74) *Attorney, Agent, or Firm* — Dentons US LLP

(57) ABSTRACT

The present invention relates to a method for transmitting an uplink signal in a wireless communication system supporting carrier aggregation of a plurality of cells including a first cell having a first type cyclic prefix and a second cell having a second type cyclic prefix, and an apparatus for the same, the method comprising: transmitting an uplink physical channel signal through the first cell in a specific sub-frame; and transmitting a sounding reference signal through the second cell in the specific sub-frame, wherein the second type cyclic prefix length is greater than the first type cyclic prefix length, a transmission interval of the sounding reference signal is overlapped with a transmission interval of the uplink physical channel signal during a specific interval, and
(Continued)

the transmission of the sounding reference signal is omitted during the specific interval when the transmission power of the terminal does not exceed a specific value.

8 Claims, 17 Drawing Sheets

(51) Int. Cl.
*H04L 27/26* (2006.01)
*H04W 72/04* (2009.01)

(52) U.S. Cl.
CPC ..... *H04L 27/2607* (2013.01); *H04W 72/0446* (2013.01); *H04L 5/001* (2013.01); *H04L 5/0035* (2013.01)

(58) Field of Classification Search
CPC ............ H04W 52/146; H04W 52/325; H04W 72/0413; H04W 72/0446; H04W 74/0833; H04W 52/365
IPC .............. H04L 5/0053, 5/0044, 5/0051, 5/0001, 5/0035, 27/2607; H04W 72/0446, 72/0413, 52/18, 52/281
See application file for complete search history.

(56) References Cited

U.S. PATENT DOCUMENTS

| | | | |
|---|---|---|---|
| 2013/0195084 A1* | 8/2013 | Chen | H04W 72/0413 370/336 |
| 2013/0272229 A1* | 10/2013 | Dinan | H04W 52/18 370/329 |
| 2013/0272230 A1 | 10/2013 | Dinan | |
| 2014/0321389 A1* | 10/2014 | Zhang | H04W 52/281 370/329 |

FOREIGN PATENT DOCUMENTS

| | | |
|---|---|---|
| CN | 102378341 A | 3/2012 |
| KR | 1020090086061 | 8/2009 |
| KR | 1020110017831 | 2/2011 |
| KR | 1020110048421 | 5/2011 |

OTHER PUBLICATIONS

Catt: "SRS transmission with multiple timing advances in Rel-11", R1-124093, 3GPP TSG RAN WG1 Meeting #70bis, San Diego, USA, Oct. 8-12, 2012.

LG Electronics: "Remaining RAN1 issues on multiple TA", R1-124314, 3GPP TSG RAN WG1 Meeting #70bis, San Diego, USA, Oct. 8-12, 2012.

* cited by examiner

FIG. 7
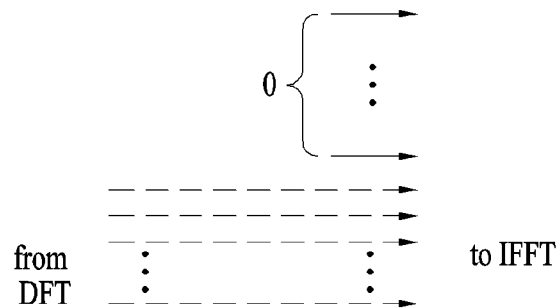
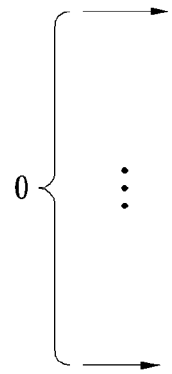
(a)
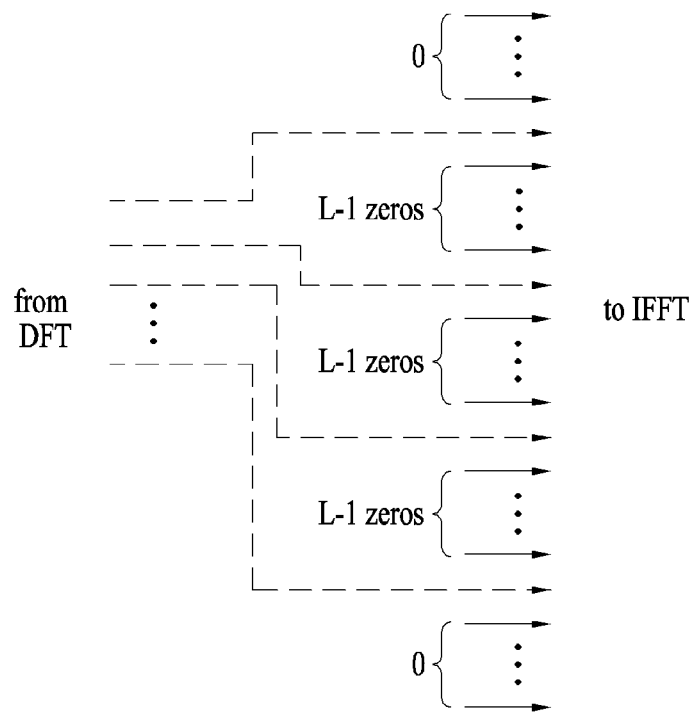
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

METHOD FOR TRANSMITTING SIGNAL AND APPARATUS FOR SAME

This application is a 35 USC §371 National Stage entry of International Application No. PCT/KR2014/000255 filed on Jan. 9, 2014, and claims priority to U.S. Provisional Application Nos. 61/750,753 filed on Jan. 9, 2013 and 61/756,467 filed on Jan. 25, 2013, all of which are hereby incorporated by reference in their entireties as if fully set forth herein.

TECHNICAL FIELD

The present invention relates to a wireless communication system, and more particularly, to a method and apparatus for efficiently transmitting an uplink signal in a wireless communication system in which cells configured to have different types of cyclic prefixes are aggregated.

BACKGROUND ART

Recently, wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention devised to solve the problem lies in a method for effectively transmitting an uplink signal.

Another object of the present invention devised to solve the problem lies in a method for effectively transmitting uplink data and/or control information and an uplink reference signal in the same subframe.

Another object of the present invention devised to solve the problem lies in a method for effectively transmitting uplink data and/or control information and an uplink reference signal in the same subframe through cells configured to have different types of cyclic prefixes.

It is to be understood that both the foregoing general description and the following detailed description of the present invention are exemplary and explanatory and are intended to provide further explanation of the invention as claimed.

Technical Solution

In an aspect of the present invention, provided herein is a method for transmitting an uplink signal by a user equipment in a wireless communication system for supporting carrier aggregation of a plurality of cells comprising a first cell configured to have a first type cyclic prefix and a second cell configured to have a second type cyclic prefix, the method comprising: transmitting an uplink physical channel signal in a specific subframe through the first cell; and transmitting a sounding reference signal in the specific subframe through the second cell, wherein a length of the second type cyclic prefix is greater than a length of the first type cyclic prefix, and wherein when a transmission period of the sounding reference signal and a transmission period of the uplink physical channel signal are overlapped with each other during a specific period and a transmission power of the user equipment does not exceed a specific value, a transmission of the sounding reference signal is skipped during at least the specific period.

In another aspect of the present invention, provided herein is a communication apparatus for transmitting an uplink signal in a wireless communication system for supporting carrier aggregation of a plurality of cells comprising a first cell configured to have a first type cyclic prefix and a second cell configured to have a second type cyclic prefix, the communication apparatus comprising: a radio frequency (RF) module; and a processor, wherein the processor is configured to: transmit an uplink physical channel signal in a specific subframe through the first cell by the RF module and transmit a sounding reference signal in the specific subframe through the second cell by the RF module, wherein a length of the second type cyclic prefix is greater than a length of the first type cyclic prefix, and wherein when a transmission period of the sounding reference signal and a transmission period of the uplink physical channel signal are overlapped with each other during a specific period and a transmission power of the user equipment does not exceed a specific value, a transmission of the sounding reference signal is skipped during at least the specific period.

Preferably, when the transmission period of the sounding reference signal and the transmission period of the uplink physical channel signal are overlapped with each other during the specific period and the transmission power of the user equipment exceeds the specific value, a transmission power of the sounding reference signal may be reduced such as not to exceed the specific value.

Preferably, when the transmission period of the sounding reference signal and the transmission period of the uplink physical channel signal are overlapped with each other during the specific period and the transmission power of the user equipment exceeds the specific value, a transmission power of the sounding reference signal may be reduced such as not to exceed the specific value during the specific period.

Preferably, when the transmission period of the sounding reference signal and the transmission period of the uplink physical channel signal are overlapped with each other during the specific period and the transmission power of the user equipment exceeds the specific value, a transmission of the sounding reference signal may be skipped during at least the specific period.

Preferably, the physical channel signal may be a rate-matched physical uplink shared channel using remaining symbols except for a last symbol of the specific subframe or a physical uplink control channel configured based on an orthogonal cover code having a length except for the last symbol of the specific subframe.

Preferably, when the first type cyclic prefix is used, one subframe comprises 14 symbols, and when the second type cyclic prefix is used, one subframe comprises 12 symbols.

Preferably, the first cell and the second cell may belong to different timing advance groups.

Advantageous Effects

According to the present invention, an uplink signal may be effectively transmitted.

According to the present invention, uplink data and/or control information and an uplink reference signal may be effectively transmitted in the same subframe.

In addition, according to the present invention, uplink data and/or control information and an uplink reference signal may be effectively transmitted in the same subframe through cells configured to have different types of cyclic prefixes.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 7 illustrates a signal mapping scheme in the frequency domain for satisfying the single carrier properties.

BEST MODE

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to not only a system in accordance with the 3GPP LTE/LTE-A standards but also a system in accordance with the other 3GPP standards, IEEE 802.xx standards, or 3GPP2 standards.

Figure 1:
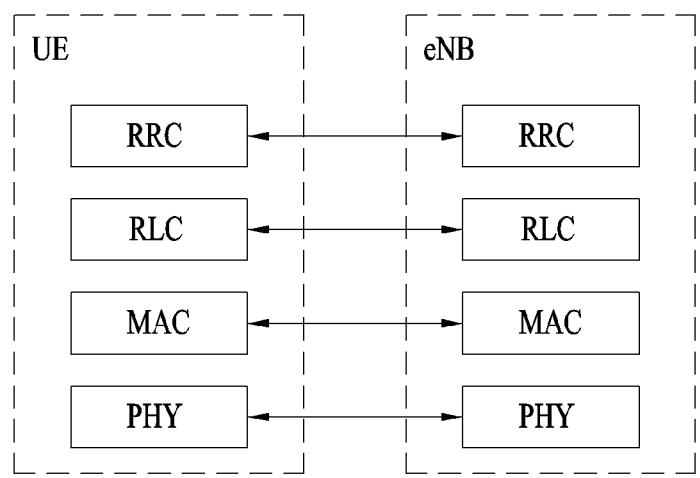
FIG. 1 illustrates layers of a radio protocol.

FIG. 1 illustrates layers of a radio protocol.

The physical layer (PHY) which is a first layer provides information transfer services to the upper layers using a physical channel. The PHY layer is connected to the upper MAC layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at transmitter and receiver sides.

Various layers exist in the second layer. First, the MAC layer serves to map various logical channels to various transport channels, and also performs logical channel multiplexing for mapping several logical channels to one transport channel. The MAC layer is connected to an upper RLC layer through a logical channel, and the logical channel is roughly divided into a control channel for transmitting control plane information and a traffic channel for transmitting user plane information according to the type of information to be transmitted.

The RLC layer of the second layer manages segmentation and concatenation of data received from an upper layer to appropriately adjusts a data size such that a lower layer can send data to a radio section. Also, the RLC layer provides three operation modes such as a Transparent Mode (TM), an Un-acknowledged Mode (UM), and an Acknowledged Mode (AM) so as to guarantee various Quality of Services (QoS) required by each Radio Bearer (RB). In particular, AM RLC performs a retransmission function through an ARQ function for reliable data transmission.

A radio resource control (RRC) layer located at the uppermost portion of the third layer is only defined in the control plane. The RRC layer performs a role of controlling logical channels, transport channels, and physical channels in relation to configuration, re-configuration, and release of a radio bearer (RB). Here, the radio bearer (RB) denotes a logical path provided by the first and the second layers for transferring data between the UE and the UTRAN. In general, the configuration of the radio bearer refers to a process of stipulating the characteristics of protocol layers and channels required for providing a specific service, and setting each of the detailed parameter and operation methods thereof. The radio bearer is divided into a Signaling radio bearer (SRB) and a Data radio bearer (DRB), wherein the SRB is used as a path for transmitting RRC messages in the control plane while the DRB is used as a path for transmitting user data in the user plane.

In a wireless communication system, UE receives information from a base station in downlink (DL), and UE transmits information to a base station in uplink (UL). The information transmitted and received between the base station and the UE includes general data information and various control information. According to type/usage of information transmitted and received between them, various physical channels exist.

Figure 2:
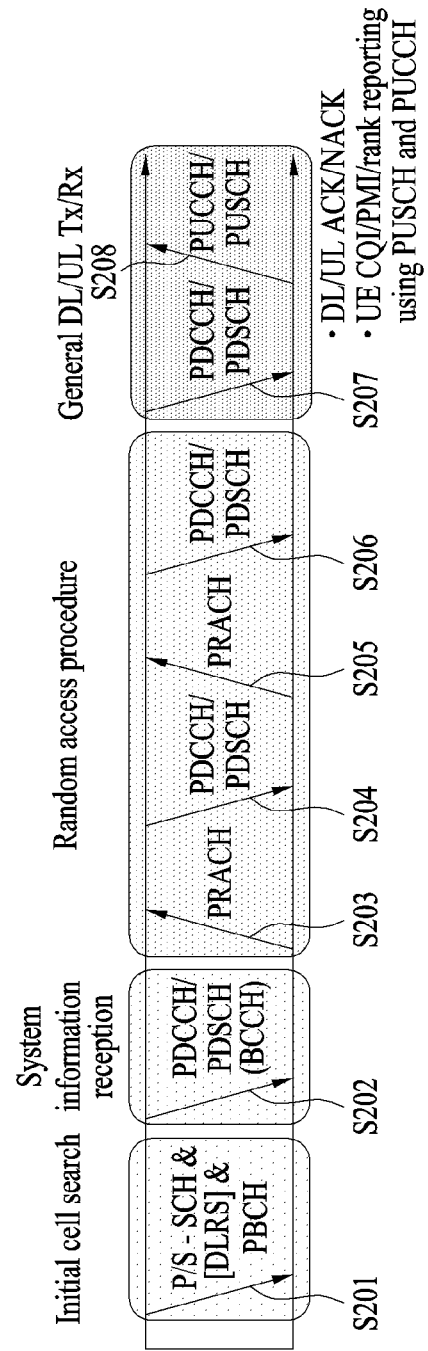
FIG. 2 illustrates physical channels and a general method for transmitting signals on the physical channels in the LTE(-A) system.

FIG. 2 illustrates physical channels and a general method for transmitting signals on the physical channels in the LTE(-A) system.

When a UE is powered on or enters a new cell, the UE performs initial cell search in step S201. The initial cell search involves acquisition of synchronization to an eNB. To this end, the UE synchronizes its timing to the eNB and acquires information such as a cell identifier (ID) by receiving a primary synchronization channel (P-SCH) and a secondary synchronization channel (S-SCH) from the eNB. Then the UE may acquire broadcast information in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

Then, the UE may perform a random access procedure such as steps S203 to S206 with the eNB. To this end, the UE may transmit a preamble on a physical random access channel (PRACH) (S203) and may receive a response message to the preamble on a PDCCH and a PDSCH associated with the PDCCH (S204). In the case of a contention-based random access, the UE may additionally perform a contention resolution procedure including transmission of an additional PRACH (S205) and reception of a PDCCH signal and a PDSCH signal corresponding to the PDCCH signal (S206).

After the above procedure, the UE may receive a PDCCH and/or a PDSCH from the eNB (S207) and transmit a physical uplink shared channel (PUSCH) and/or a physical uplink control channel (PUCCH) to the eNB (S208), in a general UL/DL signal transmission procedure. Information that the UE transmits to the eNB is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 3:
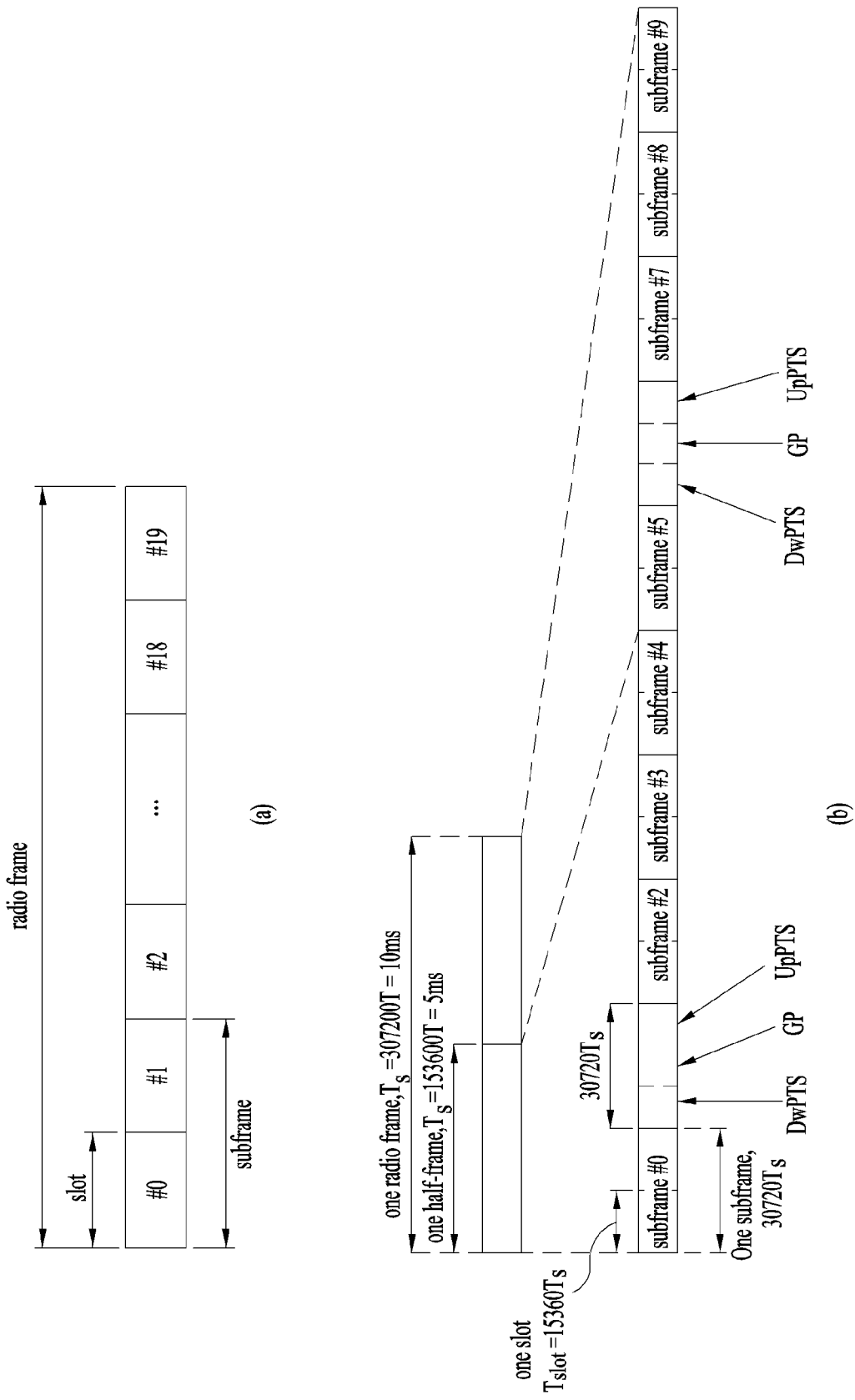
FIG. 3 illustrates a structure of a radio frame used in an LTE(-A) system.

FIG. 3 illustrates a structure of a radio frame used in an LTE(-A) system. In a cellular OFDM radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 3(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDMA is used in downlink, an OFDM symbol indicates one symbol period. Since SC-FDMA is employed in uplink of the LTE(-A) system, the OFDM symbol may be referred to as an SC-FDMA symbol, and may be collectively referred to as a symbol period. An RB as a resource assignment unit may include a plurality of consecutive subcarriers in one slot.

The length of one symbol period (or the number of OFDM symbols included in one slot) may be changed according to the type or the configuration of a cyclic prefix (CP). The cyclic prefix refers to repeating a part of a symbol (e.g. the last part of the symbol) or the entire symbol and positioning the repeated part or symbol in front of the symbol. The cyclic prefix is used to prevent an inter-symbol interference or facilitate channel measurement of a frequency-selective multi-path channel. The cyclic prefix includes an extended CP and a normal CP. For example, if OFDM or SC-FDMA symbols are configured by the normal CP, one slot may comprise 7 symbols and one subframe may comprise 14 symbols. If OFDM or SC-FDMA symbols are configured by the extended CP, since the length of one OFDM symbol is increased, the number of OFDM symbols included in one slot is less than the number of OFDM symbols in case of the normal CP. In case of the extended CP, for example, one slot may comprise 6 symbols and one subframe may comprise 12 symbols. In the case where a channel state is unstable, such as the case where a UE moves at a high speed, the extended CP may be used in order to further reduce inter-symbol interference. The length of a symbol period will be described in the present specification in more detail.

A maximum of the first three OFDM symbols in a subframe may be assigned to a physical downlink control channel (PDCCH) and the remaining OFDM symbols may be assigned to a physical downlink shared channel (PDSCH).

FIG. 3(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in an eNB and to transmit a physical random access channel (PRACH) that carriers a random access preamble for uplink transmission synchronization. The guard period is used to eliminate interference generated in uplink due to multi-path delay of a downlink signal between uplink and downlink. Table 1 below shows an uplink (UL)-downlink (DL) configuration in subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a DL subframe, U represents a UL subframe, and S represents a special subframe. The special subframe includes a downlink pilot timeslot (DwPTS), a guard period (GP), and an uplink pilot timeslot (UpPTS). Table 2 below shows a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is purely exemplary and thus the number of subframes in a radio frame, the number of slots in a subframe, or the number of symbols in a slot may vary in different ways.

Figure 4:
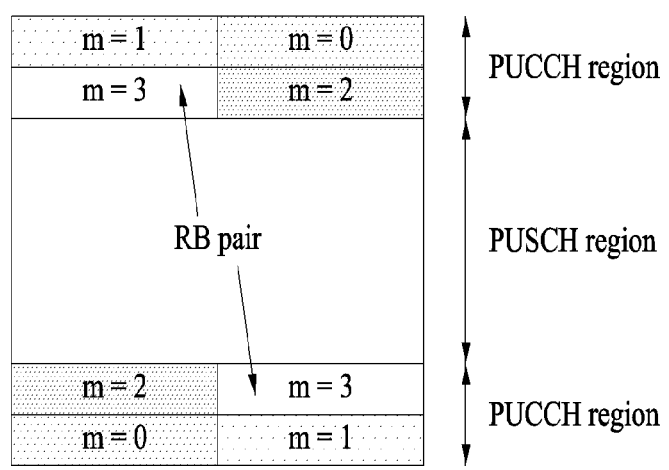
FIG. 4 illustrates a structure of an uplink subframe.

FIG. 4 illustrates a structure of an uplink subframe.

Referring to FIG. 4, an uplink subframe includes a plurality of (e.g. 2) slots. A slot may include a different number of SC-FDMA symbols according to a CP length. The UL subframe is divided into a control region and a data region in the frequency domain. The data region includes a PUSCH to transmit a data signal such as voice and the control region includes a PUCCH to transmit UCI. The PUCCH occupies a pair of RBs (e.g. m=0, 1, 2, 3)(e.g. a RB pair in the frequency mirrored positions) at both ends of the data region on a frequency axis and the RB pair frequency-hops over a slot boundary. Uplink control information (UCI) includes HARQ ACK/NACK, Channel Quality Indicator (CQI), Precoding Matrix Indicator (PMI), Rank Indicator (RI), etc.

Figure 5:
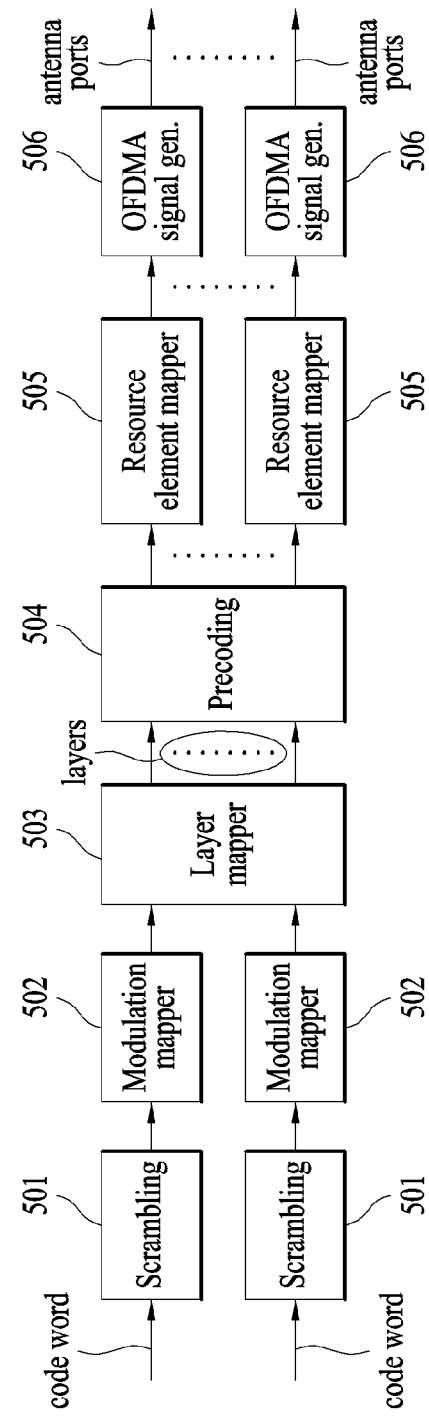
FIG. 5 illustrates a signal processing procedure that a UE performs for transmitting PUSCH.

FIG. 5 illustrates a signal processing procedure that a UE performs for transmitting PUSCH.

UE may transmit one or more codewords generated by an upper layer (e.g. MAC layer) through a physical layer. One or more codewords may be generated using data (including control information of an upper layer), and may be transmitted via physical uplink shared channel (PUSCH). A scrambling module 501 may scramble a transmission signal (e.g. codeword) using a specific scrambling signal in order to transmit the PUSCH. The scrambled signal is input to the modulation mapper 502 and the modulation mapper 502 then modulates the scrambled signal into complex symbols using a modulation scheme, such as Binary Phase Shift Keying (BPSK), Quadrature Phase Shift Keying (QPSK), or 16 Quadrature Amplitude Modulation (16QAM)/64 Quadrature Amplitude Modulation (64QAM), according to the type of the transmission signal and/or a channel status. The modulated complex symbols may be mapped to one or more layers by a layer mapper 503. Each layer may be precoded, e.g. multiplied by a precoding matrix, by a precoding module 504, and then allocated to respective transmit antennas. Transmission signals allocated per antenna may be mapped to time-frequency resource elements by a resource element mapper 505. Then, the mapped signal may be transmitted through respective antennas via a Single Carrier-Frequency Division Multiple Access (SC-FDMA) signal generator 506. A base station may restore the transmission signal from the UE by performing the corresponding procedures in a reverse order.

When a UE transmits an uplink signal in a wireless communication system, there may be a Peak to Average Power Ratio (PAPR) problem as compared to when a base station transmits a downlink signal. Thus, uplink signal transmission is performed using the SC-FDMA scheme in order to lower PAPR and meets a single carrier property. In contrast, downlink signal transmission is performed using the OFDMA scheme because PAPR is not a problem in consideration of the performance of a base station. In this case, the SC-FDMA signal generator 506 is replace with an OFDMA signal generator in the base station, and the remaining procedure (501 to 505) may be performed in the same manner as described in FIG. 5.

Figure 6:
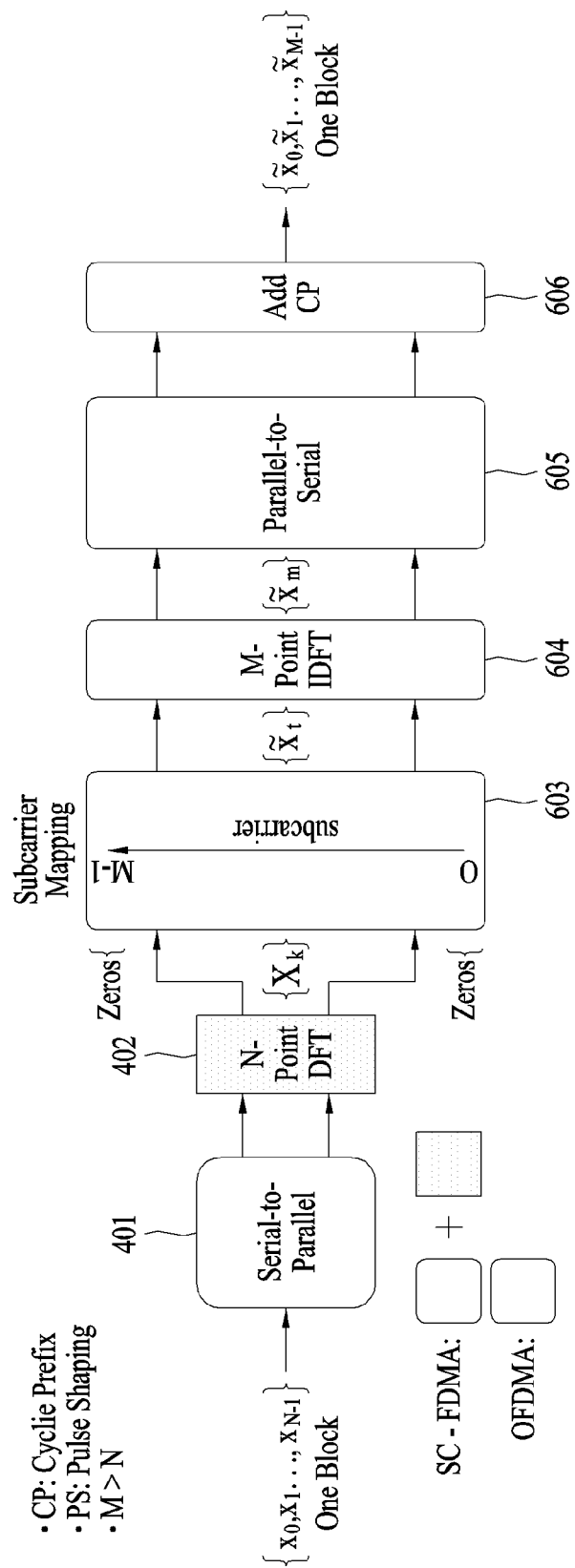
FIG. 6 illustrates an SC-FDMA scheme and an OFDMA scheme.

FIG. 6 illustrates an SC-FDMA scheme and an OFDMA scheme. As described above, the LTE(-A) system employs the OFDMA scheme in downlink and the SC-FDMA scheme in uplink.

With reference to FIG. 6, a UE for uplink signal transmission and a BS for downlink signal transmission are similar in that both include a Serial-to-Parallel converter 601, a subcarrier mapper 603, an M-point IDFT module 604 and a Cyclic Prefix (CP) addition module 606. However, a UE for transmitting a signal using the SC-FDMA scheme further includes an N-point DFT module 602. The N-point DFT module 602 compensates for a certain part of the influence of IDFT processing of the M-point IDFT module 1504 to allow a transmission signal to have single carrier properties.

FIG. 7 illustrates a signal mapping scheme in the frequency domain for satisfying the single carrier properties. FIG. 7(a) shows a localized mapping scheme and FIG. 7(b) shows a distributed mapping scheme.

FIGS. 8 to 11 illustrate a slot level structure of a PUCCH format. The PUCCH includes the following formats in order to transmit control information.

(1) Format 1: Used for on-off keying (OOK) modulation and scheduling request (SR)

(2) Format 1a and Format 1b: Used for ACK/NACK transmission
  1) Format 1a: BPSK ACK/NACK for one codeword
  2) Format 1b: QPSK ACK/NACK for two codewords (3) Format 2: Used for QPSK modulation and CQI transmission (4) Format 2a and Format 2b: Used for CQI and ACK/NACK simultaneous transmission.

Table 3 shows a modulation scheme and the number of bits per subframe according to PUCCH format. In Table 3, the PUCCH formats 2a and 2b correspond to the case of normal CP.

TABLE 3

| PUCCH format | Uplink Control Information. UCI |
|---|---|
| Format 1 | SR(Scheduling Request) (un-modulated waveform) |
| Format 1a | 1-bit HARQ ACK/NACK (with/without SR) |
| Format 1b | 2-bit HARQ ACK/NACK (with/without SR) |
| Format 2 | CSI (20 coded bits) |
| Format 2 | CSI and 1/2-bit HARQ ACK/NACK (20 bits) (Extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 bits) |

Figure 8:
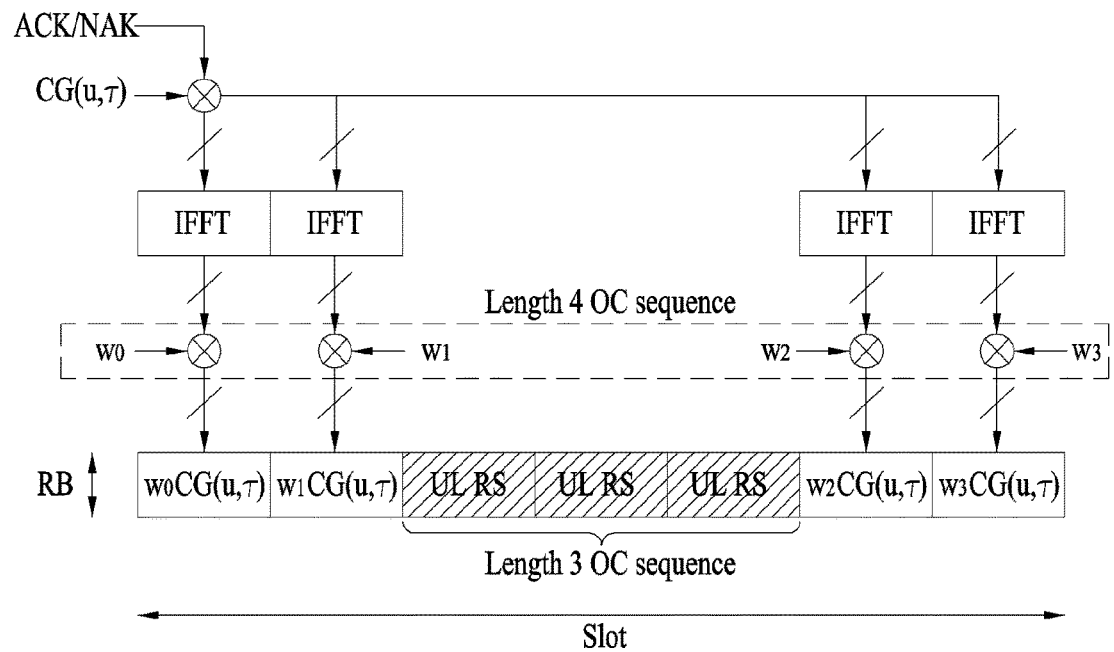
FIGS. 8 to 11 illustrate a slot level structure of a PUCCH format.
Figure 9:
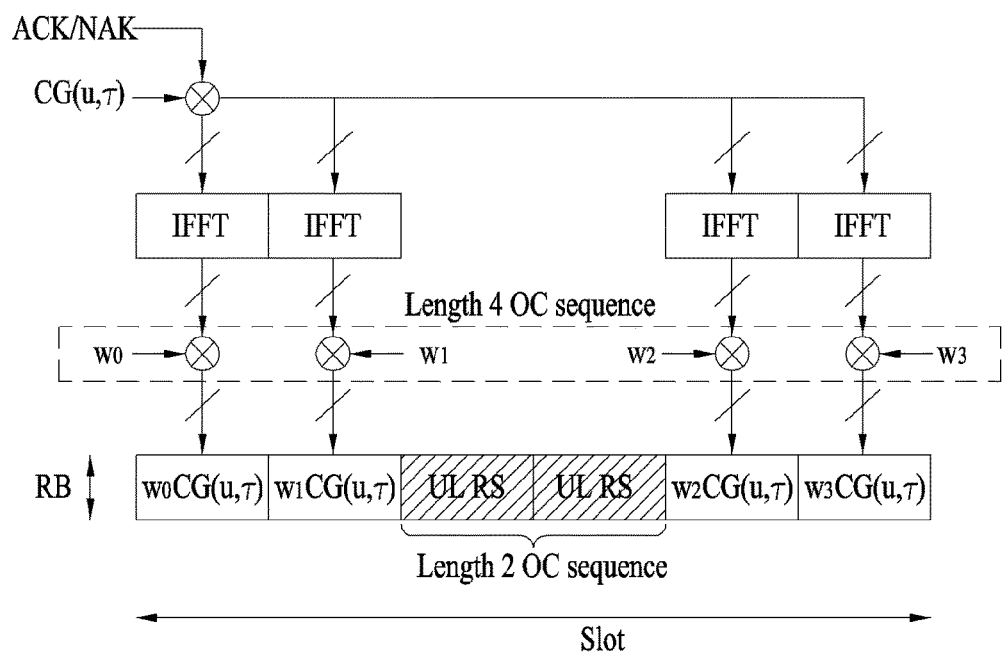

FIG. 8 illustrates a PUCCH format 1a and 1b in the case of a normal CP. FIG. 9 illustrates a PUCCH format 1a and 1b in the case of an extended CP. In the PUCCH format 1a and 1b, the same control information is repeated in each slot within a subframe. UEs transmit ACK/NACK signals through different resources that include orthogonal covers or orthogonal cover codes (OCs or OCCs) (i.e., time domain spreading code) w0, w1, w2, w3 and different cyclic shifts (i.e., different frequency domain codes) CG(u, τ) of a Computer-Generated Constant Amplitude Zero Auto Correlation (CG-CAZAC) sequence. For example, the orthogonal cover code (OC) may include Walsh/DFT orthogonal code. When the number of cyclic shifts (CSs) is 6 and the number of orthogonal cover codes (OCs) is 3, a total of 18 UEs may be multiplexed in the same Physical Resource Block (PRB) based on a single antenna. Orthogonal sequences w0, w1, w2, and w3 may be applied to an arbitrary time domain (after FFT modulation) or an arbitrary frequency domain (before FFT modulation).

For SR and persistent scheduling, ACK/NACK resources composed of cyclic shifts (CSs), orthogonal cover codes (OCs) and Physical Resource Blocks (PRBs) may be assigned to UEs through Radio Resource Control (RRC). For dynamic ACK/NACK and non-persistent scheduling, ACK/NACK resources may be implicitly assigned to the UE using the lowest CCE index of a PDCCH corresponding to the PDSCH.

Figure 10:
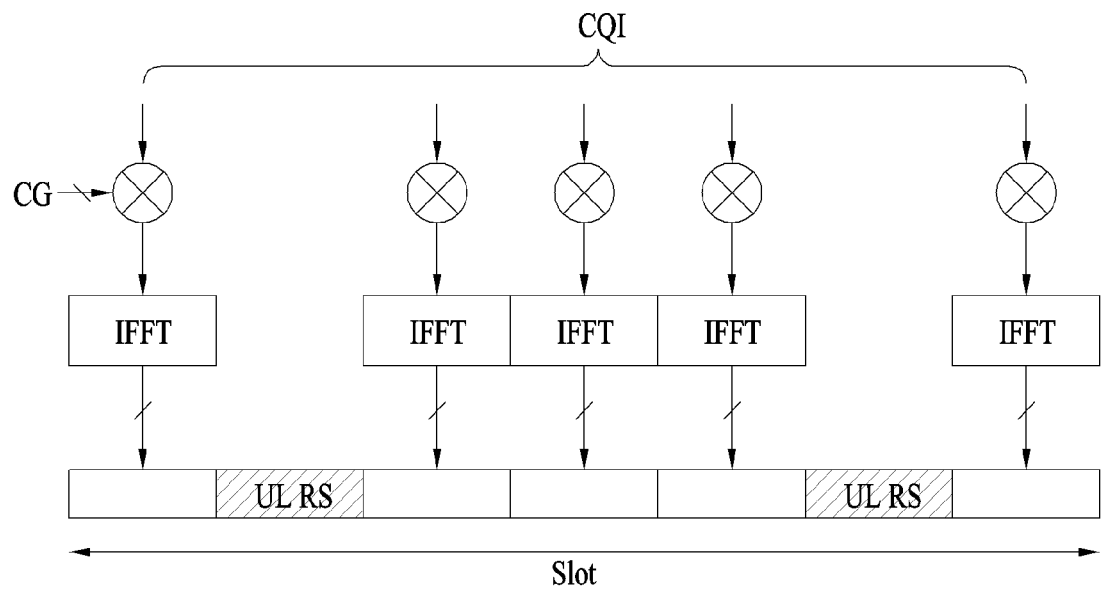
Figure 11:
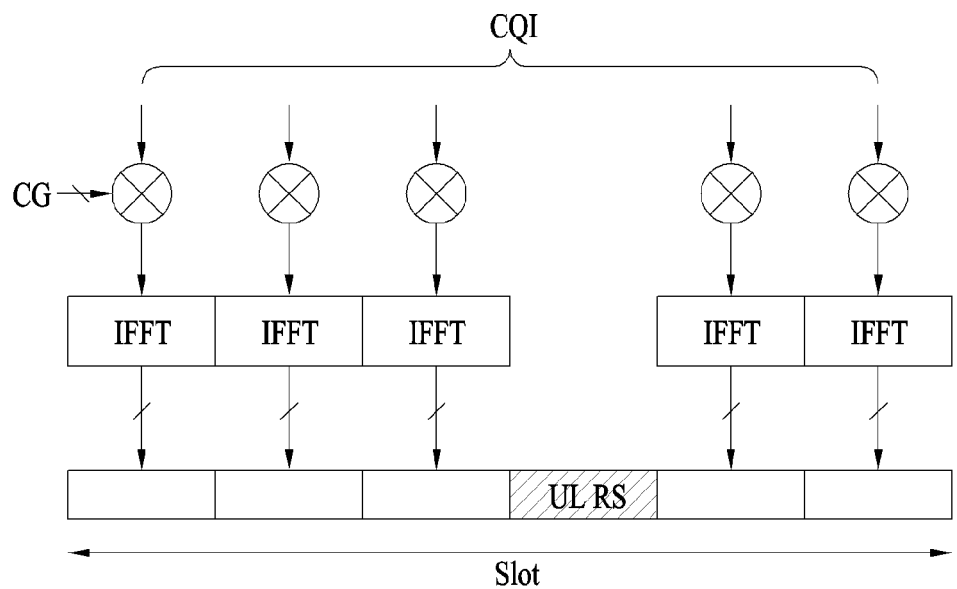

FIG. 10 illustrates a PUCCH format 2/2a/2b in the case of the normal CP. FIG. 11 illustrates a PUCCH format 2/2a/2b in the case of the extended CP. As shown in FIGS. 10 and 11, one subframe includes 10 QPSK data symbols in addition to an RS symbol in the normal CP case. Each QPSK symbol is spread in the frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in PUCCH formats 1/1a/1b and 2/2a/2b, a plurality of UEs may be multiplexed by CS+OC+PRB and CS+PRB.

Figure 12:
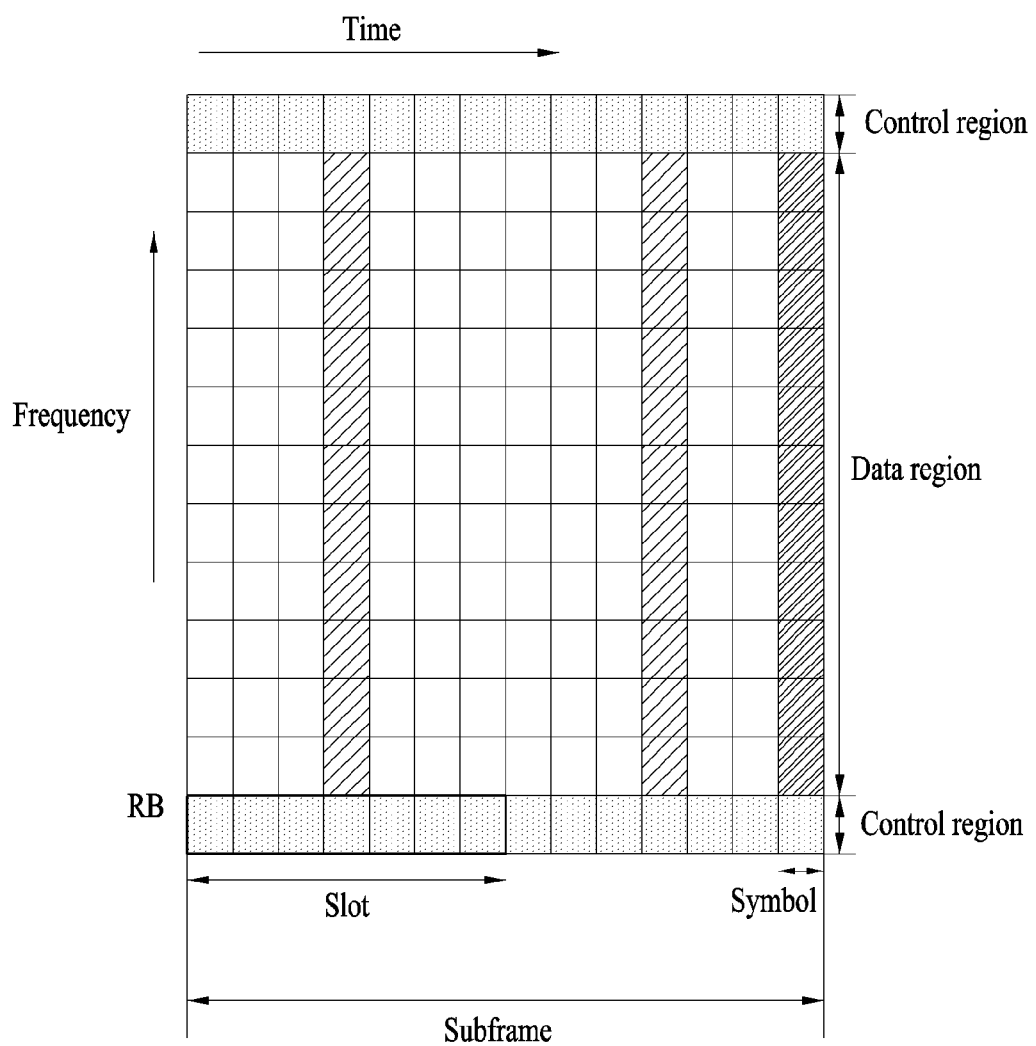
FIG. 12 illustrates an example of a reference signal used for an uplink subframe in LTE system.

FIG. 12 illustrates an example of a reference signal used for an uplink subframe in LTE system. The LTE system supports a sounding reference signal (SRS) and a demodulation reference signal as uplink reference signals. A demodulation reference signal (DMRS) can be combined with transmission of PUSCH or PUCCH, and may be transmitted by UE to a base station for demodulation of uplink signals. A sounding reference signal may be transmitted by a user equipment to a base station for uplink scheduling. The base station estimates an uplink channel using the received SRS and uses the estimated uplink channel for the uplink scheduling. The SRS is not combined with the transmission of PUSCH or PUCCH. A base sequence of an identical type can be used for the DMRS and the SRS.

Referring to FIG. 12, a user equipment can periodically or non-periodically transmit an SRS (sounding reference signal) to estimate a channel for an UL band (e.g. sub band) except a band on which PUSCH is transmitted or obtain information on a channel corresponding to a whole UL bandwidth (wide band). In case of periodically transmitting the SRS, a period can be determined via an higher layer signaling (e.g. RRC signaling). In case of non-periodically transmitting the SRS, a base station can indicate the transmission of the SRS using an 'SRS request' field of an UL-DL DCI format on PDCCH or trigger the transmission of the SRS using a triggering message. In case of a non-periodic SRS, a user equipment can transmit the SRS only when the SRS is indicated via PDCCH or a triggering message is received.

As shown in FIG. 12, a region available for transmitting an SRS in a subframe corresponds to the last SC-FDMA symbol period on a time axis in the subframe. In case of a TDD special subframe, an SRS can be transmitted via an uplink period (e.g., UpPTS). In case of a subframe configuration allocating a single symbol to an uplink period (e.g., UpPTS) according to Table 2, an SRS can be transmitted via the last one symbol. In case of a subframe configuration allocating 2 symbols, an SRS can be transmitted via the last one or two symbols. SRSs of many user equipments transmitted in the last SC-FDMA of an identical subframe can be distinguished from each other according to a frequency position.

Unlike PUSCH, an SRS does not perform DFT (discrete Fourier Transform) operation used for converting into SC-FDMA and the SRS is transmitted without using a precoding matrix which is used by PUSCH. Thus, if the SRS and PUSCH are transmitted simultaneously in one subframe in a single carrier system, the PUSCH is rate-matched to be suitable for resources except for the last symbol period of a corresponding subframe. The rate-matching refers to an operation adjusting rate (or throughput) to a desired value by puncturing or repeating bits to be transmitted. Further, transmitting PUSCH except for the last symbol period of a subframe may be referred to as a rate-matched PUSCH.

Likewise, if the SRS and PUCCH are transmitted simultaneously in one subframe in a single carrier system, the PUCCH may be processed except for the last symbol period of a corresponding subframe. In this case, the PUCCH may be constructed based on a short-length Orthogonal Cover Code (OCC) comprising remaining symbols other than the last symbol period for transmitting SRS. As such, constructing PUCCH except for the last symbol period of a subframe may be referred to as a shortened PUCCH format. For example, in the examples of FIGS. 8 and 9, an orthogonal cover code (OCC) w0, w1, w2 may be used for a shortened PUCCH format, and uplink control information may not be transmitted in the last symbol.

Moreover, a region to which a DMRS (demodulation reference signal) is transmitted in one subframe corresponds to an SC-FDMA symbol period located at the center of each slot on a time axis. Similarly, the DMRS is transmitted via a data transmission band on a frequency axis. Precoding applied to a demodulation reference signal in an uplink multi-antenna transmission may be the same as precoding applied to PUSCH.

Table 4 shows an example of the number of RSs per slot according to a PUCCH format. Table 5 shows an example of SC-FDMA symbol positions of uplink demodulation reference signals (DM RSs). For instance, the DMRS is transmitted in the 4th SC-FDMA symbol and the 11th SC-FDMA symbol in a subframe to which a normal cyclic prefix is applied.

TABLE 4

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

TABLE 5

| | Normal cyclic prefix | Extended cyclic prefix |
|---|---|---|
| 1, 1a, 1b | 2, 3, 4 | 2, 3 |
| 2, 2a, 2b | 1, 5 | 3 |

Figure 13:
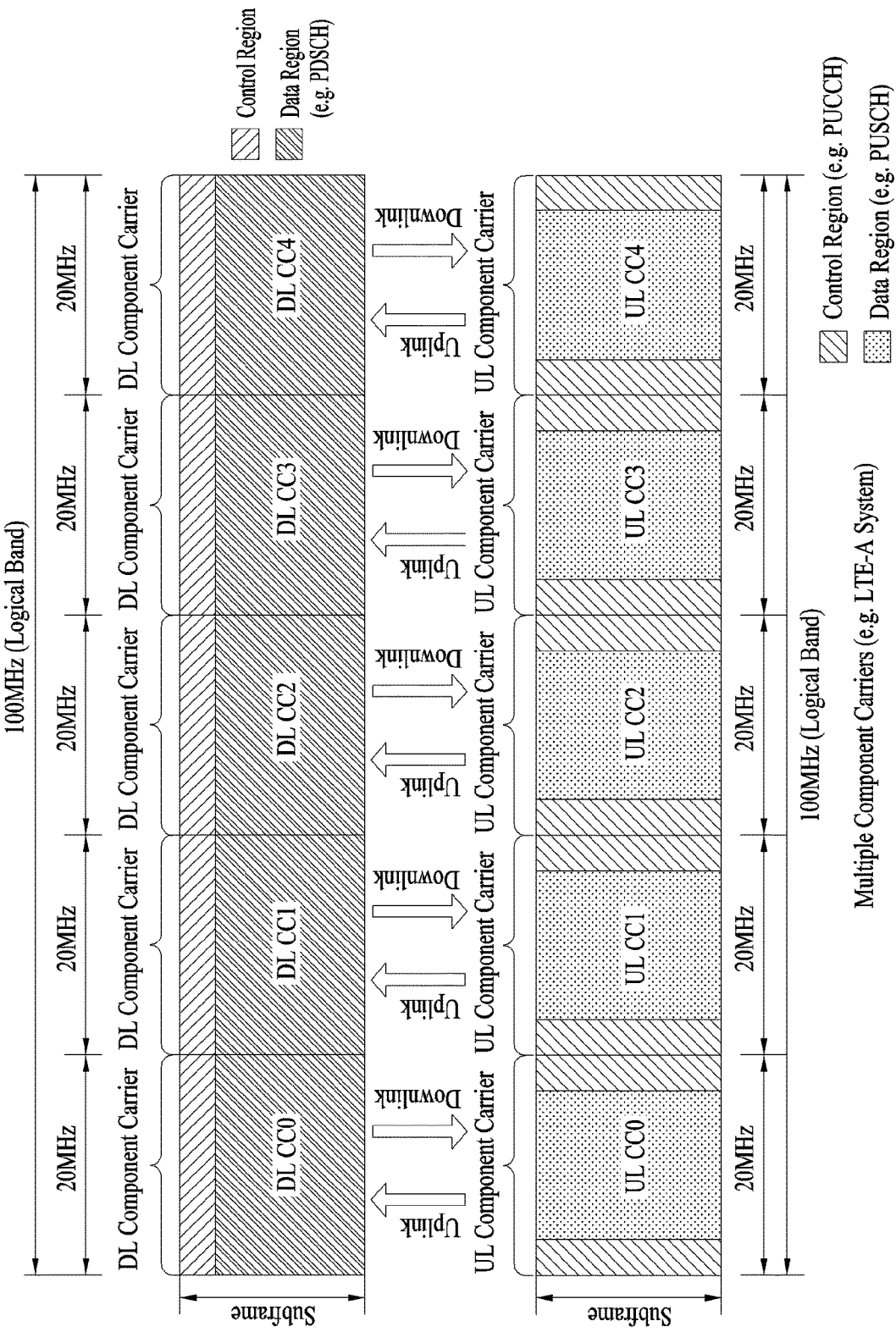
FIG. 13 illustrates a carrier aggregation (CA) communication system.

FIG. 13 illustrates a carrier aggregation (CA) communication system.

Referring to FIG. 13, a plurality of UL/DL component carriers (CCs) may be collected to support a wider UL/DL bandwidth. As such, a technique of collecting and using a plurality of uplink/downlink component carriers is referred to as carrier aggregation or bandwidth aggregation. A component carrier may be understood as a carrier frequency (a center carrier or a center frequency) for a corresponding frequency block. The CCs may or may not be adjacent to each other in the frequency domain. Bandwidths of CCs may be independently determined. Asymmetric carrier aggregation in which the number of UL CCs and the number of DL CCs are different may be possible. For example, in the case of two DL CCs and one UL CC, asymmetric carrier aggregation may be configured with 2:1. A DL CC/UL CC link may be fixed in a system or may be semi-statically configured. In addition, even if an entire band of a system is configured by N CCs, a frequency band for monitoring/receiving of a specific UE may be limited to M(<N) CCs.

Various parameters for carrier aggregation may be configured cell-specifically, UE group-specifically, or UE-specifically.

Control information may be configured to be transmitted and received through only a specific CC. The specific CC may be referred to as a primary CC (PCC) and the remaining CC may be referred to as a secondary CC (SCC). PCC refers to a CC used for UE to perform an initial connection establishment procedure or connection re-establishment procedure. PCC may refer to a cell designated during a handover procedure. SCC may be configured after RRC connection establishment is complete and may be used to provide additional radio resources. For example, uplink control information (UCI) may be configured to be transmitted only on a specific CC (e.g. PCC). The term "component carrier (CC)" may be interchangeably used with carrier, cell, etc. For example, a cell operating on a primary frequency (or PCC) may be referred to as a primary cell (PCell), and a cell operating on a secondary frequency (or SCC) may be referred to as a secondary cell (SCell). PCell and SCell may be interchangeably used with PCC and SCC respectively, and may be collectively referred to as a serving cell.

Figure 14:
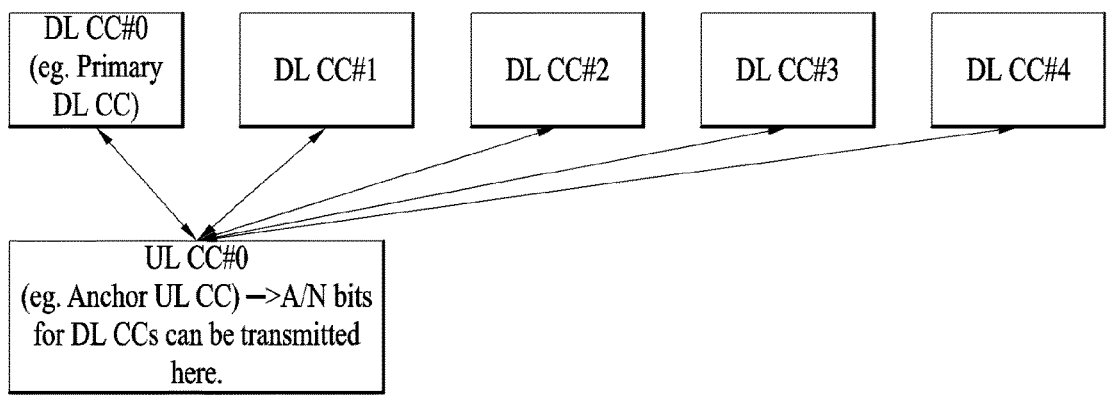
FIG. 14 illustrates an example of transmitting uplink control information (UCI) in a wireless communication system supporting carrier aggregation.

FIG. 14 illustrates an example of transmitting uplink control information (UCI) in a wireless communication system supporting carrier aggregation. For ease of explanation, it is assumed in this example that the UCI is ACK/NACK (A/N), but the UCI is not limited thereto. The UCI may include control information such as channel state information (CSI) (e.g., CQI, PMI, RI) or scheduling request information (e.g., SR).

With reference to FIG. 14, 5 DL CCs may be linked to one UL CC, thereby forming asymmetric carrier aggregation. The illustrated asymmetric carrier aggregation may be configured from the perspective of UCI transmission. That is, a DL CC-UL CC linkage for UCI and a DL CC-UL CC linkage for data may be configured differently. When it is assumed for ease of explanation that one DL CC can carry up to two codewords, at least two ACK/NACK bits are needed. In this case, in order to transmit an ACK/NACK for data received through 5 DL CCs through one UL CC, at least 10 ACK/NACK bits are needed. In order to also support a discontinuous transmission (DTX) state for each DL CC, at least 12 bits (=5⁵=3125=11.61 bits) are needed for ACK/NACK transmission. The conventional PUCCH format 1a/1b structure cannot transmit such extended ACK/NACK information since the conventional PUCCH format 1a/1b structure can transmit up to 2 ACK/NACK bits. Although carrier aggregation has been illustrated as a cause of an increase in the amount of UCI information, the amount of UCI information may also be increased due to an increase in the number of antennas and the presence of a backhaul subframe in a TDD system or a relay system. Similar to the case of ACK/NACK, the amount of control information that should be transmitted is increased even when control information associated with a plurality of DL CCs is transmitted through one UL CC. For example, UCI payload may be increased when there is a need to transmit a CQI/PMI/RI for a plurality of DL CCs.

A PUCCH format is required to support an example of FIG. 14. A PUCCH format for feedback UCI (e.g. multiple ACK/NACK bits) in a communication system supporting carrier aggregation is referred to as PUCCH format 3. For example, PUCCH format 3 may be used to transmit ACK/NACK information (possible to include DTX state) corresponding to PDSCH (or PDCCH) transmitted on multiple DL serving cells.

Figure 15:
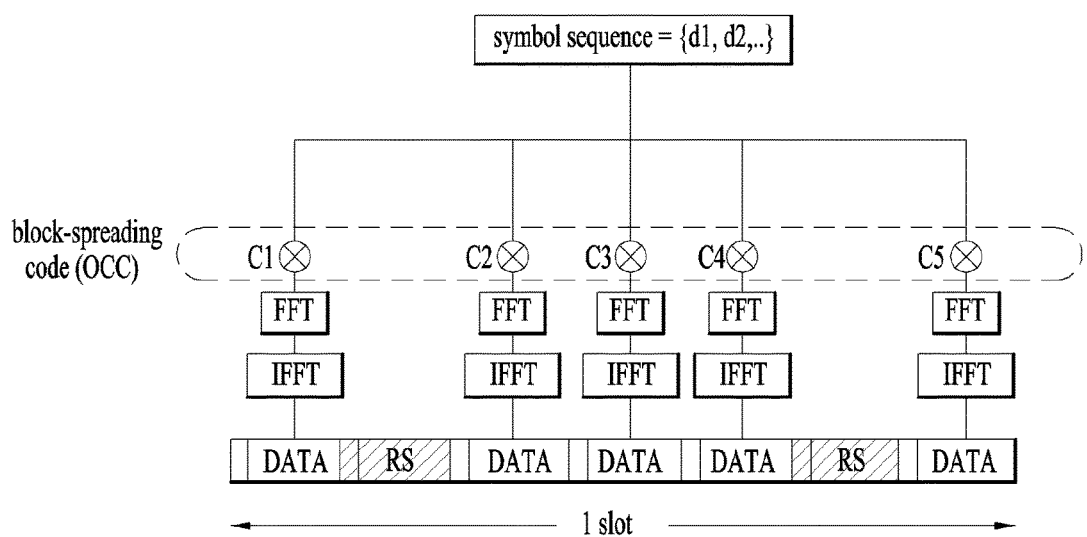
FIG. 15 illustrates an example of transmitting uplink control information using PUCCH format 3 in the case of carrier aggregation in LTE-A system.

FIG. 15 illustrates an example of transmitting uplink control information using PUCCH format 3 in the case of carrier aggregation in LTE-A system. The example of FIG. 15 employs a block-spreading technique as compared to PUCCH format 1 or 2.

As illustrated in FIG. 15, the block-spreading technique refers to time-domain spreading a symbol sequence using Orthogonal Cover Code (OCC) and transmitting the spread symbol sequence. According to the block-spreading technique, control signals of several UEs can be multiplexed in the same resource block (RB) using OCC. In the case of PUCCH format 2 as described above (e.g. FIGS. 10 and 11), one symbol sequence is transmitted throughout a time domain, and UEs are multiplexed using cyclic shifts applied to a CAZAC sequence. In contrast, in the case of the block-spreading based PUCCH format, one symbol sequence is transmitted throughout a frequency domain, and UE multiplexing is performed using OCC based time-domain spreading.

For example, as illustrated in FIG. 15, one symbol sequence is mapped into 5 SC-FDMA symbols using a length-5 (spreading factor (SF)=5) OCC $C_1$, $C_2$, $C_3$, $C_4$, $C_5$ and then transmitted. In the example of FIG. 15, a total number of two RS symbols are used for one slot as a non-limiting example, but the example may be modified to use 3 reference signal (RS) symbols and use SF=4 OCC. In this case, an RS symbol may be generated from a CAZAC sequence having a specific cyclic sequence, and may be transmitted in the form of a specific OCC being applied (or multiplied) to a plurality of RS symbols in the time domain. In the example of FIG. 15, assuming that 12 modulation symbols are used per each OFDM symbol and QPSK is used for each modulation symbol, a maximum number of bits that can be transmitted per each slot is 12×2=24 bits. Thus, a total number of 48 bits may be transmitted in two slots (e.g. Table 3). If a shortened PUCCH format is used in the example of FIG. 15, one symbol sequence may be mapped into 4 SC-FDMA symbols using a length-4 block-spreading code (OCC) $C_1$, $C_2$, $C_3$, $C_4$ and then transmitted. Thus, control information may not be transmitted in the last symbol.

Figure 16:
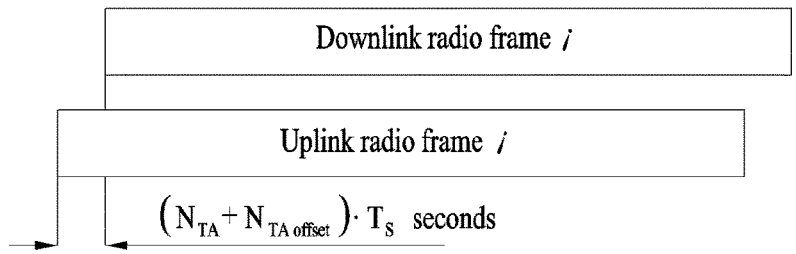
FIG. 16 illustrates an example of uplink-downlink timing relation.

FIG. 16 illustrates an example of uplink-downlink timing relation.

In the LTE system, the length of time a signal takes to reach a base station from a UE may vary according to a radius of a cell, a location of the UE in a cell, a mobility of the UE, etc. That is, unless the base station controls UL transmission timing for each UE, there is possibility of interferences between UEs during a communication between the UE and the base station, and this causes an increase of error rate in the base station. The length of time a signal takes to reach a base station from a UE may be referred to as a timing advance. Assuming that a UE may be located randomly within a cell, the timing advance from the UE to the eNB may be varied based on a location of the UE. Thus, a base station must manage or handle all data or signals transmitted by UEs within the cell in order to prevent interferences between UEs. Namely, a base station must adjust or manage a transmission timing of UEs according to each UE's circumstances, and such adjustment or management may be referred to as a maintenance of timing advance (or time alignment).

The maintenance of timing advance (or time alignment) may be performed via a random access procedure. During the random access procedure, a base station receives a random access preamble transmitted from a UE, and the base station can calculate a timing advance (Sync) value using the received random access preamble, where the timing advance value is to adjust (i.e., faster or slower) a signal transmission timing of the UE. The calculated timing advance value can be notified to the UE by a random access response, and the UE may update the signal transmission timing based on the calculated timing advance value. As an alternative, a base station may receive a sounding reference signal (SRS) transmitted from a UE periodically or randomly, the base station may calculate the timing advance (Sync) value based on the SRS, and the UE may update the signal transmission timing based on the calculated timing advance value.

As explained above, a base station may measure a timing advance of a UE via a random access preamble or SRS, and may notify an adjustment value of time alignment to the UE. Here, the value for time alignment (i.e., the adjustment value of time alignment) can be referred to as a timing advance command (TAC). The TAC may be processed by a MAC (medium access control) layer. Since a UE does not remain in a fixed location, the transmission timing is frequently changed according to the UE's location and/or mobility. Thus, if the UE receives the timing advance command (TAC) from eNB, the UE expect that the timing advance command is valid only for certain time interval. A time alignment timer (TAT) is used for indicating or representing the certain time interval. As such, the time alignment timer (TAT) is started when a UE receives a TAC (time advance command) from a base station.

With reference to FIG. 16, transmission of the uplink radio frame number i from a UE may start $(N_{TA}+N_{TAoffset})\times T_s$ seconds before the start of the corresponding downlink radio frame at the UE, where $0 \leq N_{TA} \leq 20512$, $N_{TAoffset}=0$ for FDD frame structure and $N_{TAoffset}=624$ for TDD frame structure. When $N_{TA}$ is indicated by a timing advance command, the UE may adjust a transmission timing of UL signals (e.g., PUCCH, PUSCH, SRS, etc.) by using $(N_{TA}+N_{TAoffset})\times T_s$. UL transmission timing may be adjusted in units of a multiple of $16T_s$. $T_s$ represents a sampling time. A timing advance command (TAC) in a random access response is 11 bits and indicates a value of 0 to 1282, and $N_{TA}$ is given as $N_{TA}=TA*16$. Alternatively, a timing advance command (TAC) is 6 bits and indicates a value of 0 to 63, and $N_{TA}$ is given as $N_{TA,old}+(TA-31)*16$. The timing advance command received in subframe n is applied starting from subframe n+6.

Figure 17:
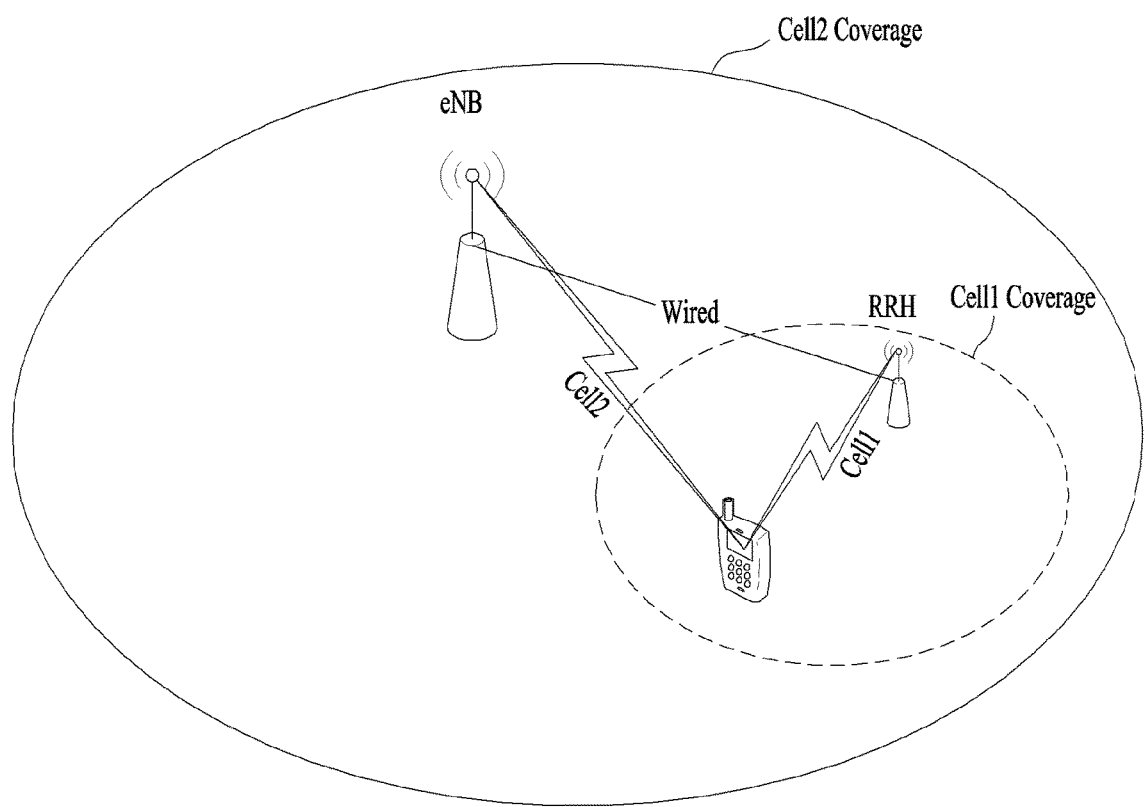
FIG. 17 illustrates an example in which a plurality of cells with different frequency properties is aggregated.

FIG. 17 illustrates an example in which a plurality of cells with different frequency properties is aggregated. In an LTE-A system, a plurality of cells in which UEs belong to different frequency bands (i.e., UEs are largely spaced apart in terms of frequency), in which UEs have different propagation delay properties, or in which UEs have different coverage may be permitted to be aggregated. In addition, in the case of a specific cell, in order to extend coverage or remove a coverage hole, a situation in which remote radio head (RRH) apparatuses such as a repeater are deployed in a cell may be considered. For example, cells formed in different places may be carrier-aggregated (inter-site carrier aggregation). A RRH may be referred to as a remote radio unit (RRU) and both an eNB and an RRU (or a RRU) may be referred to as a node or a transmission node.

Referring to FIG. 17, for example, a UE may aggregate two cells cell 1 and cell 2, the cell 1 may be formed using RRH due to limited coverage and the like, and the cell 2 may be formed to communicate directly with an eNB without RRH. In this case, propagation delay (or reception timing at the eNB) of a UL signal transmitted from the UE through the cell 1 and propagation delay (or reception timing at the eNB)

of a UL signal transmitted through the cell 2 may be different due to a position of the UE and frequency properties. As such, when a plurality of cells has different propagation delay properties, the cells have inevitably a plurality of TAs.

Figure 18:
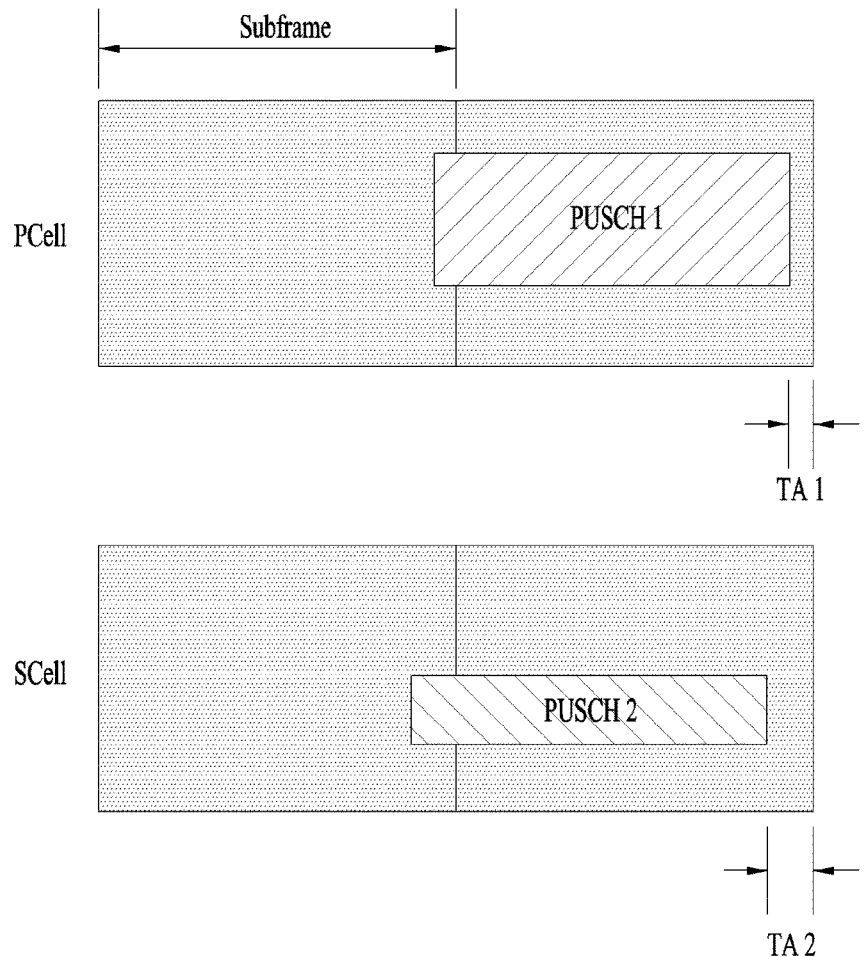
FIG. 18 illustrates a plurality of cells having different TAs.

FIG. 18 illustrates a plurality of cells having different TAs. A UE may aggregate two cells (e.g., a PCell and a SCell) and may apply different TAs to the respective cells to transmit a UL signal (e.g., PUSCH).

When the UE uses a plurality of serving cells, there may be serving sells with similar timing advance properties. For example, serving cells that use similar frequency properties (e.g., frequency bands) or have similar propagation delay properties may have similar timing advance properties. Accordingly, in order to optimize signaling overhead due to adjustment of a plurality of uplink timing synchronizations during CA, serving cells having similar timing advance properties may be managed as a group. The group may be referred to as a timing advance group (TAG). Serving cell(s) having similar timing advance properties may belong to one TAG and at least one serving cell(s) needs to have an uplink resource in the TAG. With respect to each serving cell, an eNB may notify the UE of TAG allocation using a TAG identifier through high layer signaling (e.g., RRC signaling). Two or more TAGs may be set for one UE. When a TAG identifier indicates 0, this may indicate a TAG including a PCell. For convenience, a TAG including a PCell may be referred to as a primary TAG (pTAG) and other TAG (s) except for the pTAG may be referred to as a secondary TAG (sTAG or secTAG). A secondary TAG identifier (sTAG ID) may be used to indicate a corresponding sTAG of the SCell. When the sTAG ID is not set for the SCell, the SCell may be included as a portion of the pTAG.

One TA may be commonly applied to all CCS belonging to one TAG. In this case, in the case of a TAG (e.g., pTAG) to which a PCC belongs, a TA determined based on the PCC or a TA adjusted via a random access procedure and accompanied in the PCC may be applied to a whole corresponding TAG, like in a prior art. On the other hand, in the case of a TAG (e.g., sTAG) including only SCC(s), a method for applying a TA determined based on a specific SCC in the corresponding TAG to a whole corresponding TAG may be considered. To this end, unlike in the prior art, there may be a need to also perform a random access procedure through an SCC.

Separately from timing advance (TA), different types (or lengths) of cyclic prefixes may be used according to an environment of each cell in a wireless communication system using an OFDM or SC-FDMA method or the property of data transmitted in a cell. For example, in a wireless channel environment with small cell coverage, a first type cyclic prefix (e.g., a normal cyclic prefix or a short type cyclic prefix) may be used, and in a wireless channel environment with large cell coverage, a second type cyclic prefix (e.g., extended cyclic prefix or a long type cyclic prefix) may be used. As another example, data that requires high reception performance may be transmitted using the second type cyclic prefix (e.g., an extended cyclic prefix or a long type cyclic prefix) and data that requires relatively low reception performance may be transmitted using the first type cyclic prefix (e.g., a normal cyclic prefix or a short type cyclic prefix). For example, data that requires high reception performance may be transmitted through a PCell (or PCC) and data that requires relatively low reception performance may be transmitted through a SCell (or SCC). Accordingly, the first type cyclic prefix (e.g., a normal cyclic prefix or a short type cyclic prefix) may be used for a SCell (or SCC) and the second type cyclic prefix (e.g., an extended cyclic prefix or a long type cyclic prefix) may be used for a PCell (or PCC).

For example, referring back to FIG. 17, the cell 1 may be configured with a pico cell (or a femto cell) providing only coverage close from RRH and the cell 2 may be configured with a macro cell providing large coverage from the eNB. In this case, the cell 1 may be configured to have a short type cyclic prefix (e.g., a normal cyclic prefix) and the 2 may be configured to have a long type cyclic prefix (e.g., an extended cyclic prefix). As another example, since the UE can attempt to configure initial connection with the eNB through the cell 2, the cell 2 may be configured as a PCell and the cell 1 may be configured as a SCell added to provide an additional bandwidth. In this case, the cell 1 may also be configured to have a short type cyclic prefix (e.g., a normal cyclic prefix) and the cell 2 may also be configured to have a long type cyclic prefix (e.g., an extended cyclic prefix).

Figure 19:
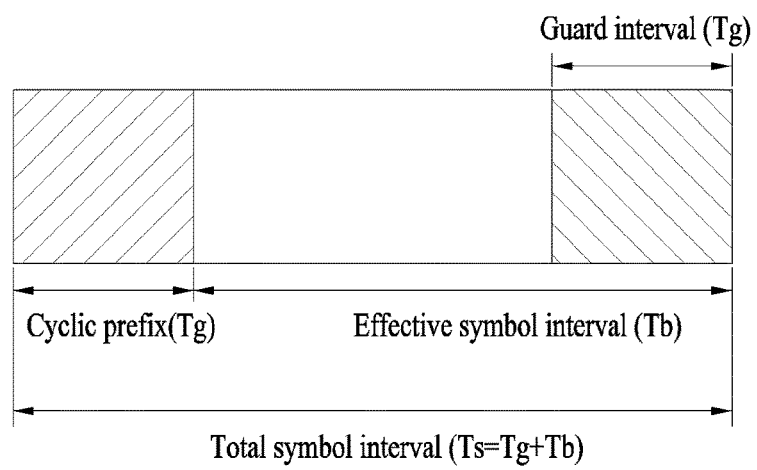
FIG. 19 illustrates a symbol interval including a cyclic prefix.

FIG. 19 illustrates a symbol interval including a cyclic prefix. For example, the symbol interval may refer to one OFDM symbol or SC-FDMA symbol.

Referring to FIG. 19, a cyclic prefix Tg may be formed by repeatedly inserting a guard interval Tg of an effective symbol interval Tb in front of the effective symbol interval Tb. Accordingly, the symbol interval Ts may be represented as the sum of the guard interval Tg and the effective symbol interval Tb in which data is actually transmitted. Accordingly, when types or lengths of a cyclic prefix CP are different, the lengths of symbol intervals may be different. According to a cyclic prefix CP, the guard interval may be removed at a receiving end and then modulation may be performed by applying data in the effective symbol interval. A transmitting end and a receiving end may be synchronized with each other using a cyclic prefix CP and may maintain orthogonality between data symbols.

Figure 20:
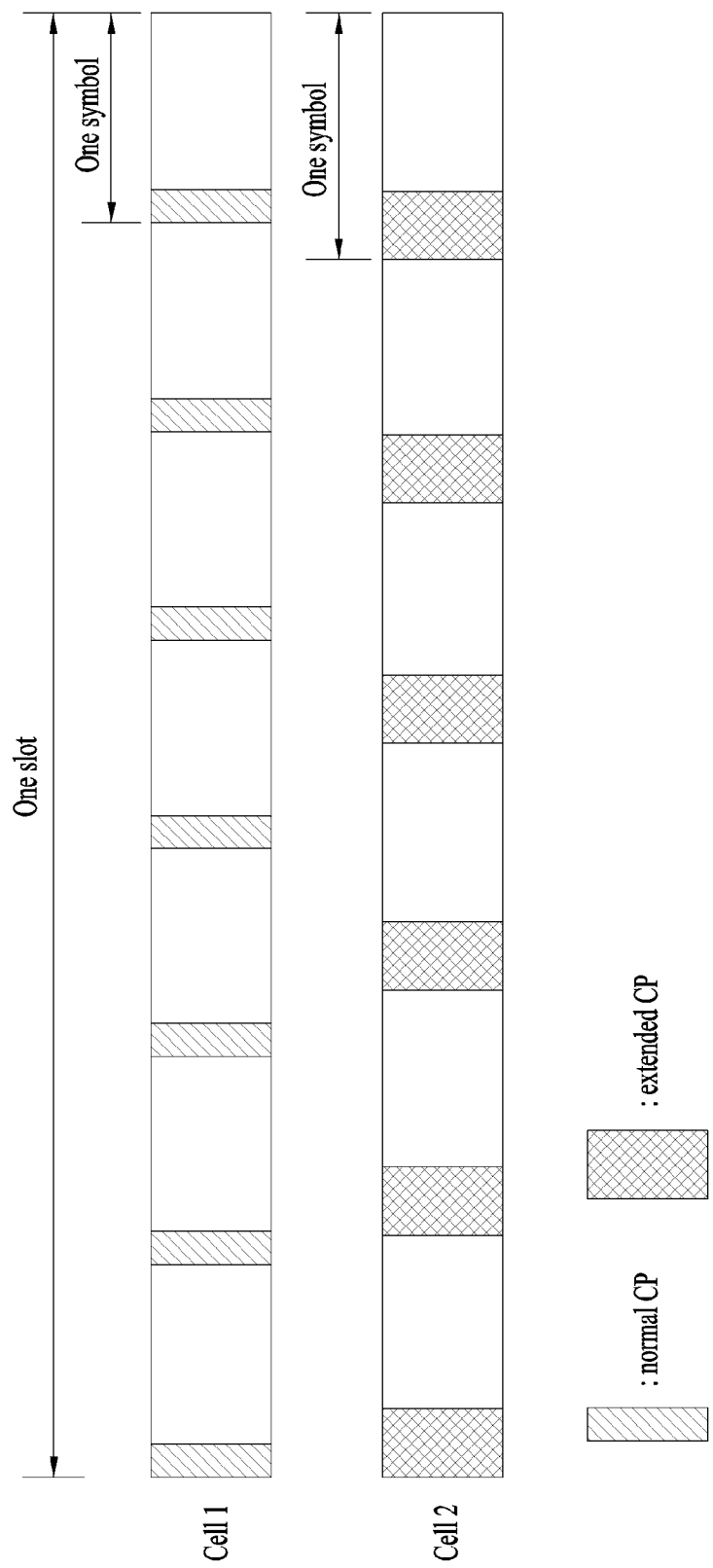
FIG. 20 illustrates a length of a symbol interval when different CP types are used.

FIG. 20 illustrates a length of a symbol interval when different CP types are used. For example, the different CP types may include a normal cyclic prefix and an extended cyclic prefix.

Referring to FIG. 20, a first type CP (e.g., a normal cyclic prefix) is used for a cell 1 and a second type (e.g., an extended cyclic prefix) is used for a cell 2. In the case of the cell 1, one slot may include seven symbols (or symbol intervals), and in the case of cell 2, one slot may include six symbols (or symbol intervals). Since one subframe includes two slots, in the case of the cell 1, one subframe may include 14 symbols (or symbol intervals), and in the case of cell 2, one subframe may include 12 symbols (or symbol intervals).

The examples described with reference to FIG. 17 may be applied to the example of FIG. 20. For example, since the cell 1 has low propagation delay, the cell 1 may correspond to a pico cell or a femto cell, and since the cell 2 has high propagation delay, the cell 2 may correspond to a macro cell. As another example, the cell 1 may be configured as a SCell and the 2 may be configured as a PCell. In the cases, the cell 1 may be configured to have a first type CP (e.g., a normal cyclic prefix) and the cell 2 may be configured to have a second type CP (e.g., an extended cyclic prefix).

A single carrier/cell based LTE system may require simultaneous transmission of a physical uplink shared channel (PUSCH) and a sounding reference signal (SRS) in one subframe. In this case, in order to protect the SRS and maintain the single carrier property of a UL signal, transmission of a last symbol (in which the SRS is transmitted) among resources allocated to the PUSCH may be skipped and a rate-matched PUSCH may be transmitted while the corresponding symbol is excluded. Hereinafter, for convenience of description, a CC or a carrier may be interchangeably used with a cell.

Similarly, simultaneous transmission of a PUCCH and an SRS may be required in one subframe. In this case, in order to also protect the SRS and maintain the single carrier property of a UL signal, orthogonal cover code (OCC) based shortened PUCCH format with a short length including only the remaining symbols except for a last symbol (in which the SRS is transmitted) may be used.

An LTE-A based on carrier aggregation (CA) between a plurality of cells may also require simultaneous transmission of a PUSCH and an SRS or a PUCCH and an SRS in one subframe. In this case, in order to also protect the SRS and maintain the property of a UL signal, a rate-matched PUSCH or shortened PUCCH format may be transmitted/used. In this case, unlike in a single cell based LTE system, a cell for transmission of PUSCH/PUCCH and a cell for transmission of a SRS may be different. In this case, when CP types (or CP lengths) (e.g., a normal CP or an extended CP)) configured for a cell for transmission of PUSCH/PUCCH and a cell for transmission of a SRS are the same, any problem may not occur (in terms of protection of a SRS and maintaining of UL signal property). On the other hand, when CP types (or CP lengths) configured for two cells are different, (even if rate-matched PUSCH/shortened PUCCH format is applied), a PUSCH/PUCCH signal and a SRS signal may be overlapped at the same time point.

For example, when CP types (or CP lengths) configured for respective cells are the same, the lengths of symbol intervals configured for the respective cells may be the same. In this case, when rate-matched PUSCH/shortened PUCCH format is transmitted through one cell and a SRS is transmitted through another cell, since signal transmission periods of the cells are not overlapped in the time axis, single carrier properties are maintained and the SRS may be protected. On the other hand, for example, when CP types (or CP lengths) configured for respective cells are different, lengths of symbol intervals configured for the respective cells may be different. In this case, a last symbol interval of a specific ell and a second symbol interval from the last of another cell may be overlapped, and thus a transmission period of a SRS and a transmission period of rate-matched PUSCH/shortened PUCCH format may be overlapped in the time axis.

Figure 21:
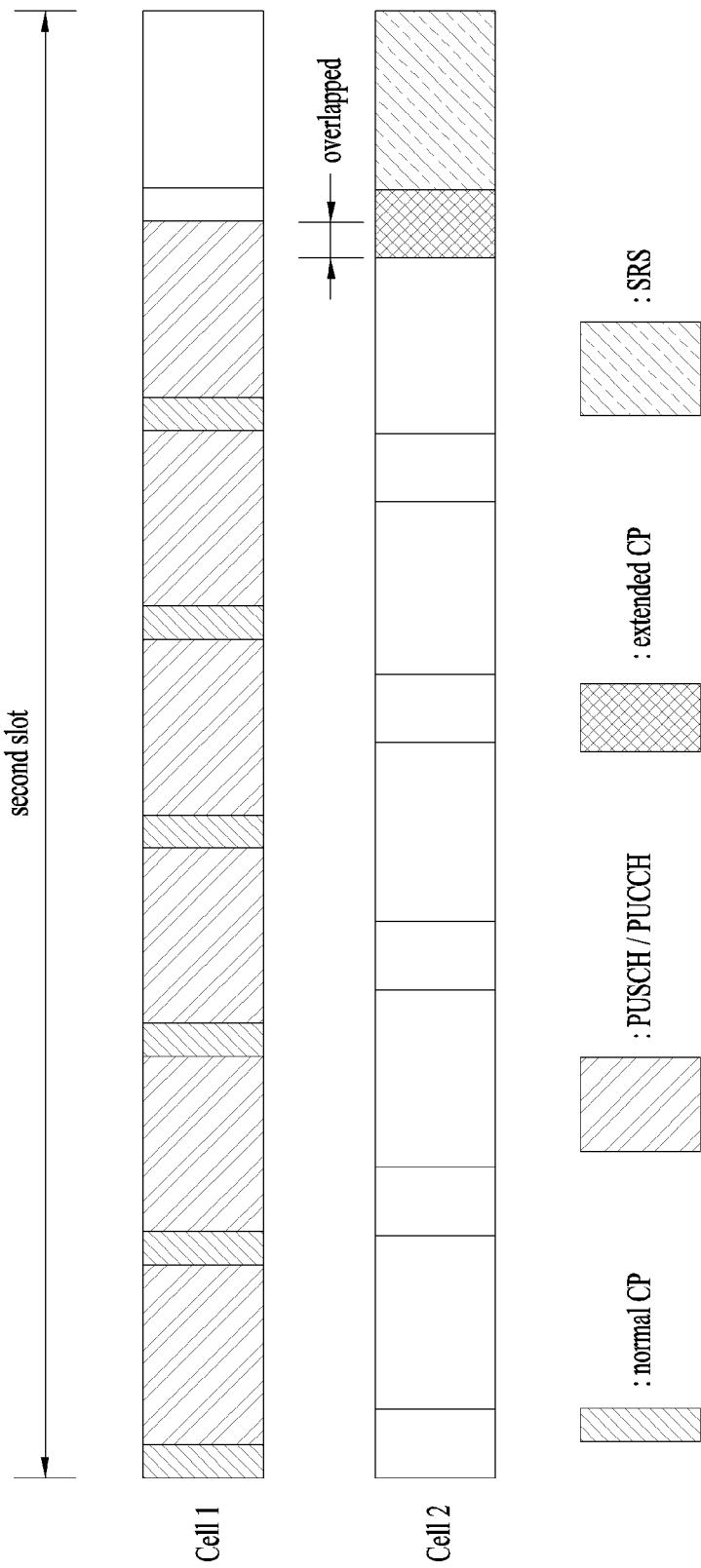
FIG. 21 illustrates an example in which a SRS and PUSCH/PUCCH are simultaneously transmitted when cells with different CP lengths are carrier-aggregated.

FIG. 21 illustrates an example in which a SRS and PUSCH/PUCCH are simultaneously transmitted when cells with different CP types (or CP lengths) are carrier-aggregated.

Referring to FIG. 21, CP types (or CP lengths) of a cell 1 and a cell 2 may be configured as a first type CP (e.g., a normal cyclic prefix) and a second type CP (e.g., an extended cyclic prefix), respectively, and PUSCH/PUCCH and a SRS may be configured to be simultaneously transmitted in one subframe. In the example of FIG. 21, the cell 1 may be configured to have the first type CP (e.g., a normal cyclic prefix) and to transmit rate-matched PUSCH and/or shortened PUCCH format. In addition, in the same subframe, the cell 2 may be configured to have a second type CP (e.g., an extended cyclic prefix) and to transmit a SRS. In this case, a last symbol (e.g., a rear part of a sixth symbol in a second slot of the cell 1) of PUSCH/PUCCH may be overlapped with a SRS symbol (e.g., a front part of a sixth symbol in a second slot in the cell 2). Accordingly, in this case, in order to protect a SRS, maintain UL signal property, and adjust UL power, an appropriate UE operation needs to be defined. The uplink power adjustment may be performed, for example, when a UE reaches maximum power limitation or a transmission power of the UE exceeds the maximum power limitation. Contrary to the example of FIG. 21, there may not exist any problem when a CP type (or a CP length) of a PUSCH/PUCCH transmission ell is configured as an extended CP and a CP type (or a CP length) of a SRS transmission cell is configured as a normal CP.

Accordingly, the present invention proposes an operation of a UE for simultaneous transmission of PUSCH/PUCCH and a SRS through cells having different CP types (or CP lengths) when the cells having different CP types (or CP lengths) are carrier-aggregated. In more detail, the present invention proposes an operation of a UE for simultaneously performing transmission of a rate-matched PUSCH and/or shortened PUCCH format and transmission of SRS through different cells configured to have different CP types (or CP lengths) in one subframe. For example, the present invention may be applied to the case in which a CP length (e.g., a normal CP) of a cell for transmission of a rate-matched PUSCH and/or shortened PUCCH format is smaller than a CP length (e.g., an extended CP) of a cell for transmission of a SRS. The proposed method may be classified as a method 1 and a method 2 according to whether maximum power limitation (MPL) is present. The expression "with MPL" means that a transmission power of a UE exceeds maximum power limitation of the UE and the expression "without MPL" means that a transmission power of the UE does not exceed maximum power limitation of the UE. In the specification, PUSCH/PUCCH may refer to a PUSCH and/or a PUCCH.

Method 1—when a Transmission Power does not Exceed Maximum Power Limitation of the UE (or without MPL)

A. Method 1-1: Transmit SRS

In the method 1-1, PUSCH/PUCCH and a SRS cannot be simultaneously transmitted. In this case, single carrier property may not be maintained, and thus a peak-to-average power ratio (PAPR) value may be high. Accordingly, in the case of a UE having low performance (e.g., performance of a power amplifier), signal distortion may occur, but in the case of a UE having high performance, signal distortion may be prevented despite a high PAPR. Accordingly, the method 1-1 may be advantageous for a UE having high performance in that PUSCH/PUCCH and a SRS can be simultaneously transmitted.

B. Method 1-2: Drop SRS

In the method 1-2, SRS transmission may be dropped/skipped and only PUSCH/PUCCH may be transmitted. In this case, the method 1-2 may be appropriate for the case in which both purposes for protecting a SRS and maintaining single carrier property are satisfied irrespective of performance of a UE.

C. Method 1-3: Omit CP of SRS

In the method 1-3, PUSCH/PUCCH and a SRS may be simultaneously transmitted but transmission of a partial or entire portion of a CP of the SRS may be dropped/omitted. For example, the CP portion of the SRS in which transmission is dropped/omitted may be an entire period that is overlapped with PUSCH/PUCCH in the time axis or a portion of a front portion of the overlapped portion. Like in the method 1-2, the method 1-3 may also be appropriate for the case in which both purposes for protecting a SRS and maintaining single carrier property are satisfied irrespective of performance of the UE. However, in order to apply the method 1-3, additional computational capability for adjusting the length of a cyclic prefix (CP) may be required.

Method 2—when a Transmission Power Exceeds Maximum Power Limitation of the UE (or with MPL)

A. Method 2-1: Reduce Power

In the method 2-1, PUSCH/PUCCH and a SRS may be simultaneously transmitted and a PUSCH/PUCCH transmission power and/or a SRS transmission power may be reduced such that a total transmission power of the UE does not exceed maximum power limitation. The SRS transmission power may be preferentially reduced to the PUSCH/PUCCH transmission power. Like in the method 1-1, the method 2-1 may be advantageous for a UE having high performance in that PUSCH/PUCCH and a SRS can be simultaneously transmitted.

B. Method 2-2: Drop SRS

In the method 2-2, transmission may be dropped/skipped and only PUSCH/PUCCH may be transmitted Like in the method 1-2, the method 2-2 may be appropriate for the case in which both purposes for protecting a SRS and maintaining single carrier property are satisfied irrespective of performance of a UE.

C. Method 2-3: Omit CP of SPS

In the method 2-3, PUSCH/PUCCH and a SRS may be simultaneously transmitted but transmission of a partial or entire portion of a CP of the SRS may be dropped/omitted. For example, the CP portion of the SRS in which transmission is dropped/omitted may be an entire period that is overlapped with PUSCH/PUCCH in the time axis or a portion of a front portion of the overlapped portion. Like in the method 2-2, the method 2-3 may also be appropriate for the case in which both purposes for protecting a SRS and maintaining single carrier property are satisfied irrespective of performance of the UE. However, in order to apply the method 2-3, a UE needs to have capability for adjusting a length of a cyclic prefix (CP) by a UE.

In the embodiments of the present invention, the methods 1 and 2 may be managed as follows when a transmission power exceeds maximum power limitation (or with MPL) or does not exceed maximum power limitation (or without MPL). According to an embodiment of the present invention, when the method 1-1 is applied to a situation in which a transmission power does not exceed maximum power limitation (or without MPL), the method 2-1, 2-2, or 2-3 may be applied to a situation in which the transmission power exceed maximum power limitation (or with MPL). In this embodiment, even if single carrier property is not maintained, signal distortion may be prevented by performance of a UE (e.g., performance of a power amplifier), and thus the UE may selectively apply the methods 2-1, 2-2, and 2-3 when the transmission power does not exceed maximum power limitation (or without MPL).

According to another embodiment of the present invention, when the method 1-2 may be applied to a situation in which the transmission power does not exceed maximum power limitation (or without MPL), the method 2-2 may be applied to a situation in which the transmission power exceeds maximum power limitation (or with MPL). In this embodiment, a SRS may be consistently dropped in order to maintain the property and signal transmission property of the UE (to protect a SRS and maintain single carrier property).

According to another embodiment of the present invention, when the method 1-3 may be applied to a situation in which the transmission power does not exceed maximum power limitation (or without MPL), the method 2-2 or 2-3 may be applied to a situation in which the transmission power exceeds maximum power limitation (or with MPL). In this embodiment, a UE has capability for adjusting the length of a cyclic prefix (CP), and thus the UE may selectively apply the methods 2-2 and 2-3.

As described with reference to FIGS. 17 and 18, when a plurality of cells having different propagation delay properties is aggregated, different timing advance (TA) values may be configured to respective cells. For example, referring back to FIG. 17, the cell 1 may be configured as a pico cell (or a femto cell) and the cell 2 may be configured as a macro cell. In this case, when the cell 1 is positioned at a boundary region of coverage of the cell 2, TA values may be different. On the other hand, when the cell 1 is positioned in a central portion of the cell 2, TA values may be the same. Accordingly, TA values may be the same or different according to positions of cells, but CP types (or CP lengths) may be different when difference in cell coverage is large irrespective of positions of cells.

As described above, cells having the same or similar TA values may be formed as one timing advance group (TAG). Accordingly, cells that belong to one TAG may be configured to have different CP types (or CP lengths) according to cell coverage or to have the same CP type (or CP length). In addition, cells that belong to different TAGs may also be configured to have different CP types (or CP lengths) according to cell coverage or to have the same CP type (or CP length).

In the embodiments of the present invention, the method 1 and the method 2 may be combined according to a TAG. According to an embodiment of the present invention, when two cells belong to the same TAG, the method 1-2 or 1-3 may be applied to a situation in which a transmission power does not exceed maximum power limitation (or without MPL), and the method 2-2 or 2-3 may be applied to a situation in which a transmission power exceeds maximum power limitation (or with MPL). This embodiment may also be applied in the same way to the case in which only one TAG is configured for the UE or a plurality of TAGs are not configured for the UE.

According to another embodiment of the present invention, when two cells belong to different TAGs, the method 1-1 may be applied to a situation in which a transmission power does not exceed maximum power limitation (or without MPL) and the method 2-1, 2-2, or 2-3 may be applied to a situation in which a transmission power exceeds maximum power limitation (or with MPL).

According to another embodiment of the present invention, CP types (or CP lengths) configured for all cells belonging to one TAG may be limited to be the same. Alternatively, one TAG may be configured with only cells configured to have the same CP type (or CP length). In this case, even if PUSCH/PUCCH and a SRS are simultaneously transmitted in one subframe in at least one TA group, transmission periods of respective signals may be prevented from being overlapped with each other.

Figure 22:
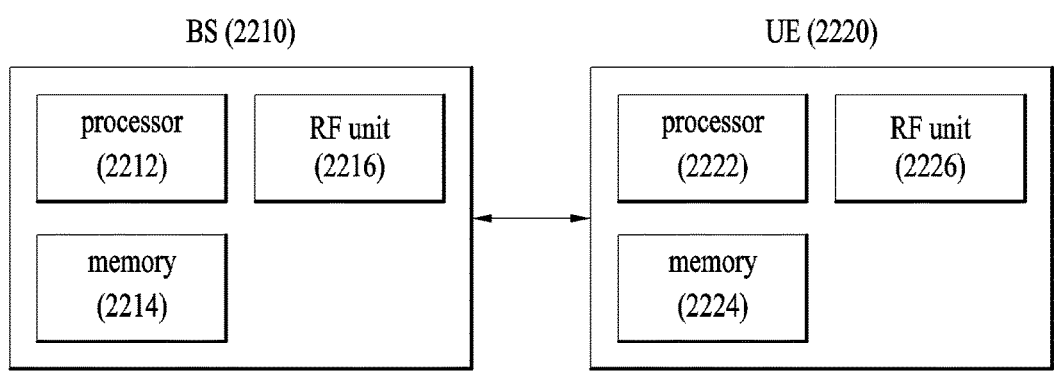
FIG. 22 illustrates a base station and a UE to which the present invention is applicable.

FIG. 22 illustrates a base station and a UE to which the present invention is applicable.

Referring to FIG. 22, a wireless communication system includes a base station (BS) 2210 and a user equipment (UE) 2220. When the wireless communication system includes a relay, the BS 2210 or the UE 2220 can be replaced with the relay.

The BS 2210 includes a processor 2212, a memory 2214, and a radio frequency (RF) unit 2216. The processor 2212 may be configured to embody the procedures and/or methods proposed by the present invention. The memory 2214 is connected to the processor 2212 and stores various pieces of information associated with an operation of the processor 2212. The RF unit 2216 is connected to the processor 2212 and transmits/receives a radio signal. The UE 2220 includes a process 2222, a memory 2224, and an RF unit 2226. The processor 2222 may be configured to embody the procedures and/or methods proposed by the present invention. The memory 2224 is connected to the processor 2222 and stores various pieces of information associated with an operation of the processor 2222. The RF unit 2226 is connected to the processor 2222 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method for transmitting an uplink signal by a user equipment (UE) in a wireless communication system, the UE being configured with a plurality of cells including a first cell and a second cell, the method comprising:
configuring a physical uplink channel transmission in a shortened format, based on the physical uplink channel transmission on the first cell and a sounding reference signal (SRS) transmission on the second cell being configured in the same subframe,
wherein a last symbol of the subframe is not used for the shortened format, and the last symbol of the subframe is used for the SRS transmission;
determining whether the physical uplink channel transmission and the SRS transmission overlap in a symbol of the subframe, based on the first cell and the second cell having different cyclic prefixes and having the same timing advance;
performing the physical uplink channel transmission in the subframe with the SRS transmission dropped in the subframe, based on the physical uplink channel transmission and the SRS transmission overlapping in the symbol of the subframe and a transmission power of the UE exceeding a maximum transmission power; and
performing the physical uplink channel transmission and the SRS transmission in the subframe, based on the physical uplink channel transmission and the SRS transmission overlapping in the symbol of the subframe and the transmission power of the UE not exceeding the maximum transmission power.

2. The method according to claim 1, wherein the physical uplink channel transmission includes a physical uplink shared channel or a physical uplink control channel.

3. The method according to claim 1, wherein the first cell has a normal cyclic prefix and one subframe comprises 14 symbols, and
wherein the second cell has an extended cyclic prefix and one subframe comprises 12 symbols.

4. The method according to claim 1, wherein the same timing advance is applied for the first cell and the second cell.

5. A communication apparatus for transmitting an uplink signal in a wireless communication system, the communication apparatus being configured with a plurality of cells comprising a first cell and a second cell, the communication apparatus comprising:
a radio frequency (RF) module; and
a processor operably connected with the RF unit, that:
configures a physical uplink channel transmission in a shortened format, based on the physical uplink channel transmission on the first cell and a sounding reference signal (SRS) transmission on the second cell being configured in the same subframe,
wherein a last symbol of the subframe is not used for the shortened format, and the last symbol of the subframe is used for the SRS transmission,
determines whether the physical uplink channel transmission and the SRS transmission overlap in a symbol of the subframe, based on the first cell and the second cell having different cyclic prefixes and having the same timing advance,
performs the physical uplink channel transmission in the subframe with the SRS transmission dropped in the subframe, based on the physical uplink channel transmission and the SRS transmission overlapping in the symbol of the subframe and a transmission power of the UE exceeding a maximum transmission power, and performs the physical uplink channel transmission and the SRS transmission in the subframe, based on the physical uplink channel transmission and the SRS transmission overlapping in the symbol of the subframe and the transmission power of the UE not exceeding the maximum transmission power.

6. The communication apparatus according to claim 5, wherein the physical uplink channel transmission includes a physical uplink shared channel or a physical uplink control channel.

7. The communication apparatus according to claim 5, wherein the first cell has a normal cyclic prefix and one subframe comprises 14 symbols, and wherein the second cell has an extended cyclic prefix and one subframe comprises 12 symbols.

8. The communication apparatus according to claim 5, wherein the same timing advance is applied for the first cell and the second cell.

\* \* \* \* \*